US 6,718,697 B2

(12) United States Patent
Voorhees

(10) Patent No.: US 6,718,697 B2
(45) Date of Patent: *Apr. 13, 2004

(54) SPONSORED SMALL VEHICLE STORAGE DEVICE

(75) Inventor: Stephen C. Voorhees, Bellevue, WA (US)

(73) Assignee: Bikelid Systems LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/341,513

(22) Filed: Jan. 13, 2003

(65) Prior Publication Data

US 2003/0097803 A1 May 29, 2003

Related U.S. Application Data

(60) Division of application No. 09/514,174, filed on Feb. 28, 2000, now Pat. No. 6,505,637, which is a continuation-in-part of application No. 09/051,472, filed on Sep. 8, 1998, now Pat. No. 6,068,120.

(51) Int. Cl.[7] .............................. E04B 3/00; E04H 6/00
(52) U.S. Cl. ...................... 52/79.4; 52/69; 52/DIG. 14; 135/87; 40/540; 40/590; 206/335; D12/402
(58) Field of Search ............................ 52/79.4, 64, 69, 52/DIG. 14; 135/87, 97; 40/594, 588, 589, 590, 591, 592, 540; 217/37; 224/488; D12/402; 206/335; 150/167

(56) References Cited

U.S. PATENT DOCUMENTS

| | | | | |
|---|---|---|---|---|
| 616,445 A | * | 12/1898 | Anderson | 217/43 R |
| 2,311,514 A | | 2/1943 | Bremblett | |
| 2,742,674 A | * | 4/1956 | Melder | 52/64 |
| 3,180,510 A | * | 4/1965 | Moller | 414/476 |
| 3,258,886 A | * | 7/1966 | Button | 52/64 |
| 3,438,158 A | * | 4/1969 | Kane | 52/64 |
| 3,600,866 A | * | 8/1971 | Griffith | 52/64 |
| 3,682,523 A | | 8/1972 | Esposito | |
| 3,734,272 A | * | 5/1973 | Galen | 206/335 |

(List continued on next page.)

FOREIGN PATENT DOCUMENTS

| | | | | |
|---|---|---|---|---|
| DE | 830697 | | 2/1952 | |
| DE | 846458 | | 8/1952 | |
| DE | 19833546 A1 | * | 1/2000 | E04H/6/16 |
| FR | 2449765 | | 9/1980 | |
| FR | 2499617 | | 8/1982 | |
| WO | WO 9714861 | * | 4/1997 | E04H/6/00 |

OTHER PUBLICATIONS

Cycle–Safe, Inc. Sales Catalog, "Cycle–Safe® Bicycle–Commuter Security Lockers".
Madrax Sales Materials from http://www.madrax.com/home.ltm.

*Primary Examiner*—Brian E. Glessner
(74) *Attorney, Agent, or Firm*—St. Onge Steward Johnston & Reens LLC

(57) ABSTRACT

A durable, secure small storage device that protects small vehicles from the elements and theft, as well as provides a platform upon which sponsors can advertise. Sponsors can include any entity that seeks to advertise or convey a specialized message such as corporations, universities, non-profit organizations, individuals, or governmental entities. The storage device includes a frame having a cross rod component and an upwardly extending rod component for laterally supporting a vehicle. A rigid shell is pivotally connected to the frame at the cross rod component and provides shelter and protection for the vehicle stored inside. The invention further includes an advertising means for displaying advertisements of sponsors. In another aspect, the invention comprises a method of providing site owners with such small vehicle storage devices at little or no cost using funds received from advertisers in return for advertising space in conjunction with the devices.

26 Claims, 27 Drawing Sheets

U.S. PATENT DOCUMENTS

| | | | |
|---|---|---|---|
| 3,826,026 A | * | 7/1974 | Bevan .................... 40/644 |
| 3,861,092 A | | 1/1975 | Dale et al. |
| 3,886,988 A | | 6/1975 | Garrett et al. |
| 3,907,184 A | | 9/1975 | Zane et al. |
| 3,945,159 A | | 3/1976 | Girnus, Sr. |
| 3,949,528 A | | 4/1976 | Hartger et al. |
| 3,967,425 A | | 7/1976 | Wolverton et al. |
| 3,973,812 A | | 8/1976 | Poltorak |
| 3,996,704 A | | 12/1976 | Huey |
| 4,016,686 A | | 4/1977 | Hartger et al. |
| 4,084,735 A | | 4/1978 | Kappas |
| 4,133,148 A | * | 1/1979 | Swenumson .................... 52/64 |
| 4,438,606 A | | 3/1984 | Chardon et al. |
| 4,598,693 A | | 7/1986 | Koziol |
| 4,609,133 A | * | 9/1986 | Anderson .................... 224/317 |
| 4,693,289 A | | 9/1987 | Taylor et al. |
| 4,804,238 A | | 2/1989 | Bischof et al. |
| 4,894,961 A | * | 1/1990 | Robbins .................... 52/69 |
| 4,907,728 A | | 3/1990 | Giblet |
| 4,986,037 A | * | 1/1991 | Jackson, Jr. .................... 52/67 |
| 5,265,385 A | | 11/1993 | Smith et al. |
| 5,459,954 A | * | 10/1995 | Bronaugh et al. .................... 40/476 |
| 5,507,121 A | * | 4/1996 | Taylor .................... 52/66 |
| 5,533,616 A | | 7/1996 | Crowfoot |
| 5,690,234 A | | 11/1997 | Rhead et al. |
| D391,219 S | | 2/1998 | Voorhees |
| 5,720,312 A | * | 2/1998 | Scheuermann .................... 135/88.09 |
| 6,012,253 A | * | 1/2000 | Burns .................... 52/79.5 |
| 6,023,870 A | * | 2/2000 | McGarrah .................... 40/606.03 |
| 6,341,451 B1 | * | 1/2002 | Morton, Sr. .................... 52/64 |

* cited by examiner

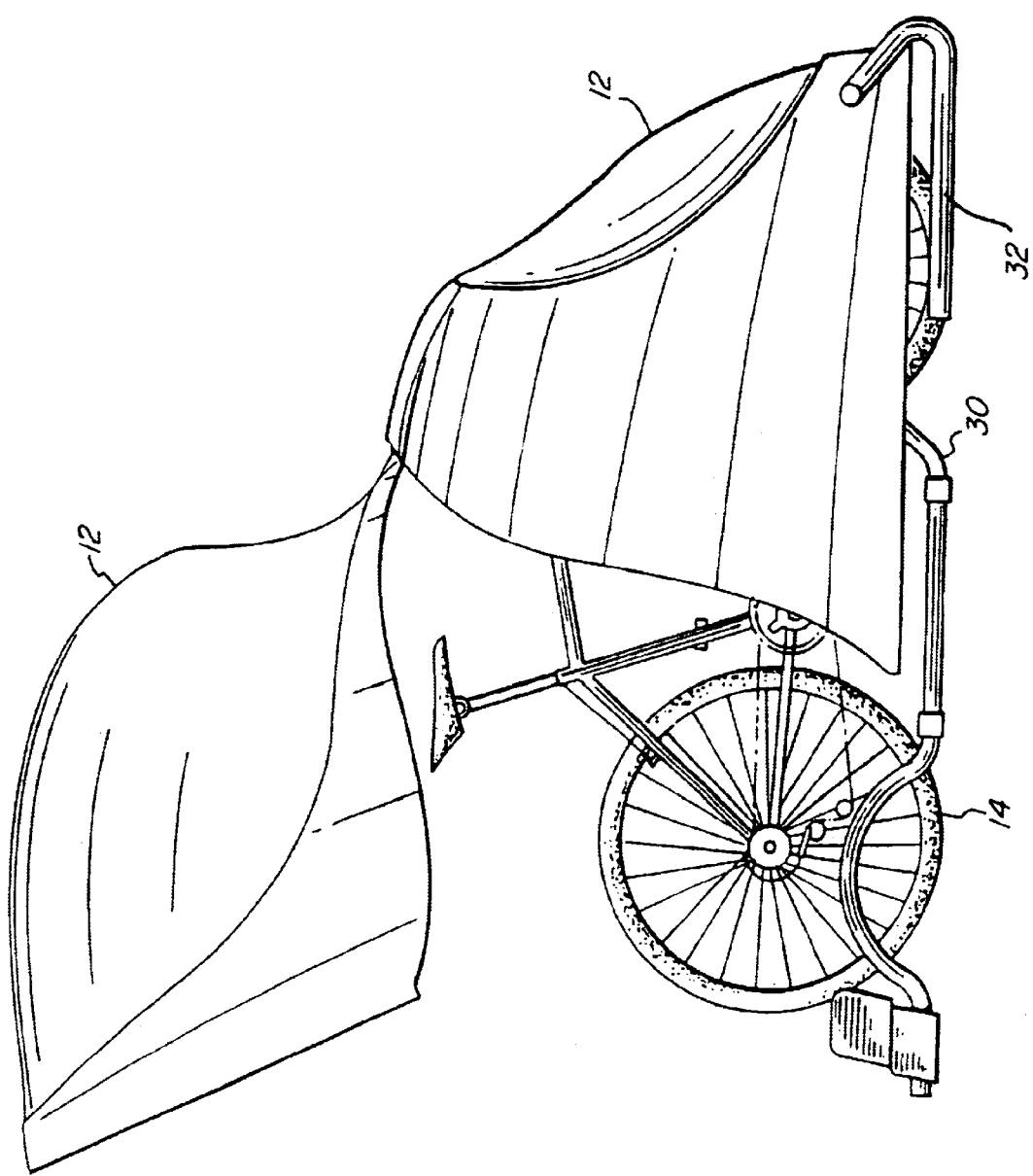

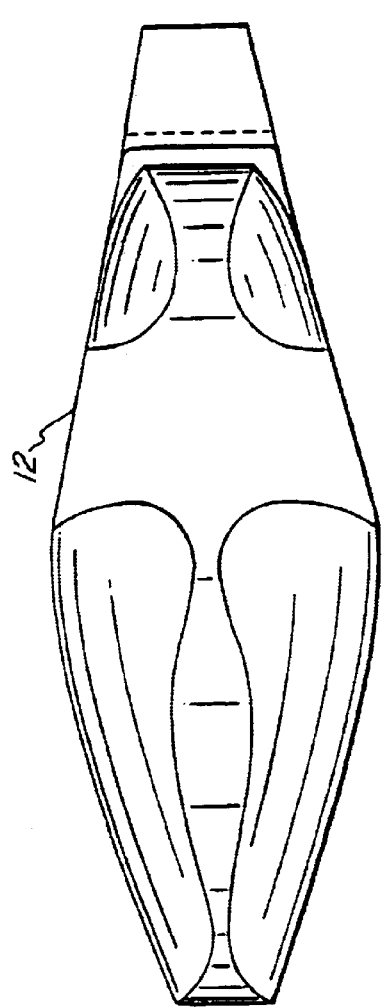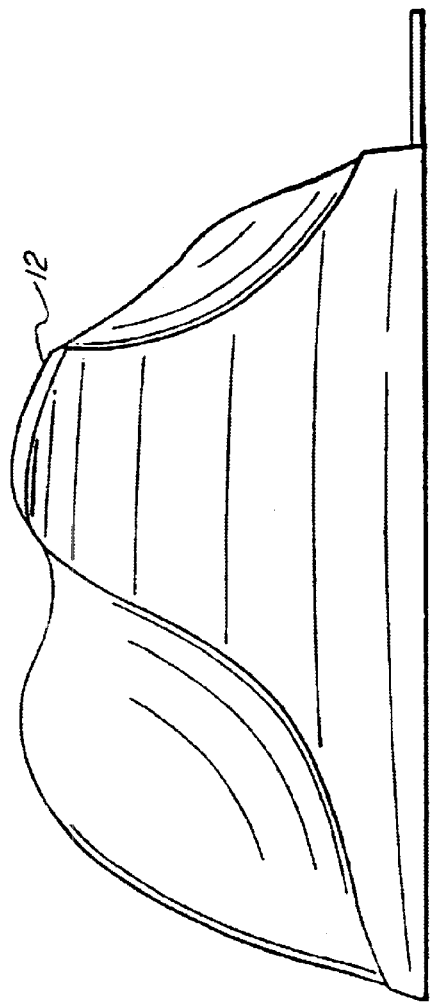
FIG. 18
FIG. 19

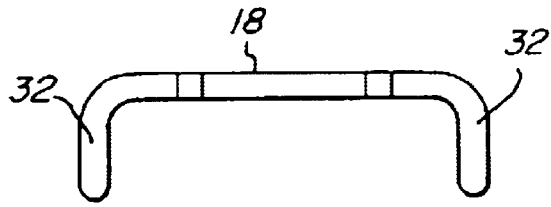
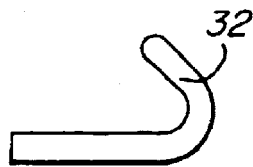
FIG. 24a  FIG. 24b
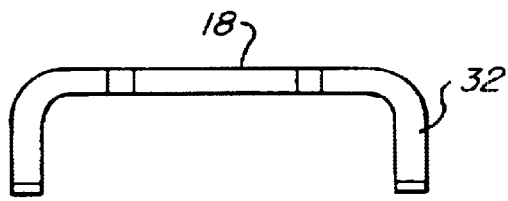
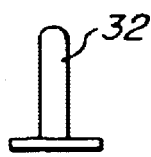
FIG. 25a  FIG. 25b
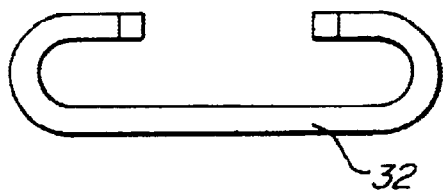
FIG. 26a  FIG. 26b
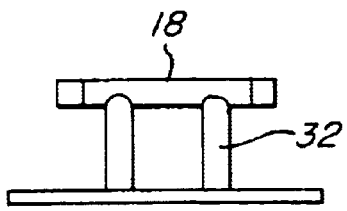
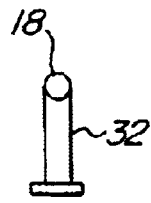
FIG. 27a  FIG. 27b

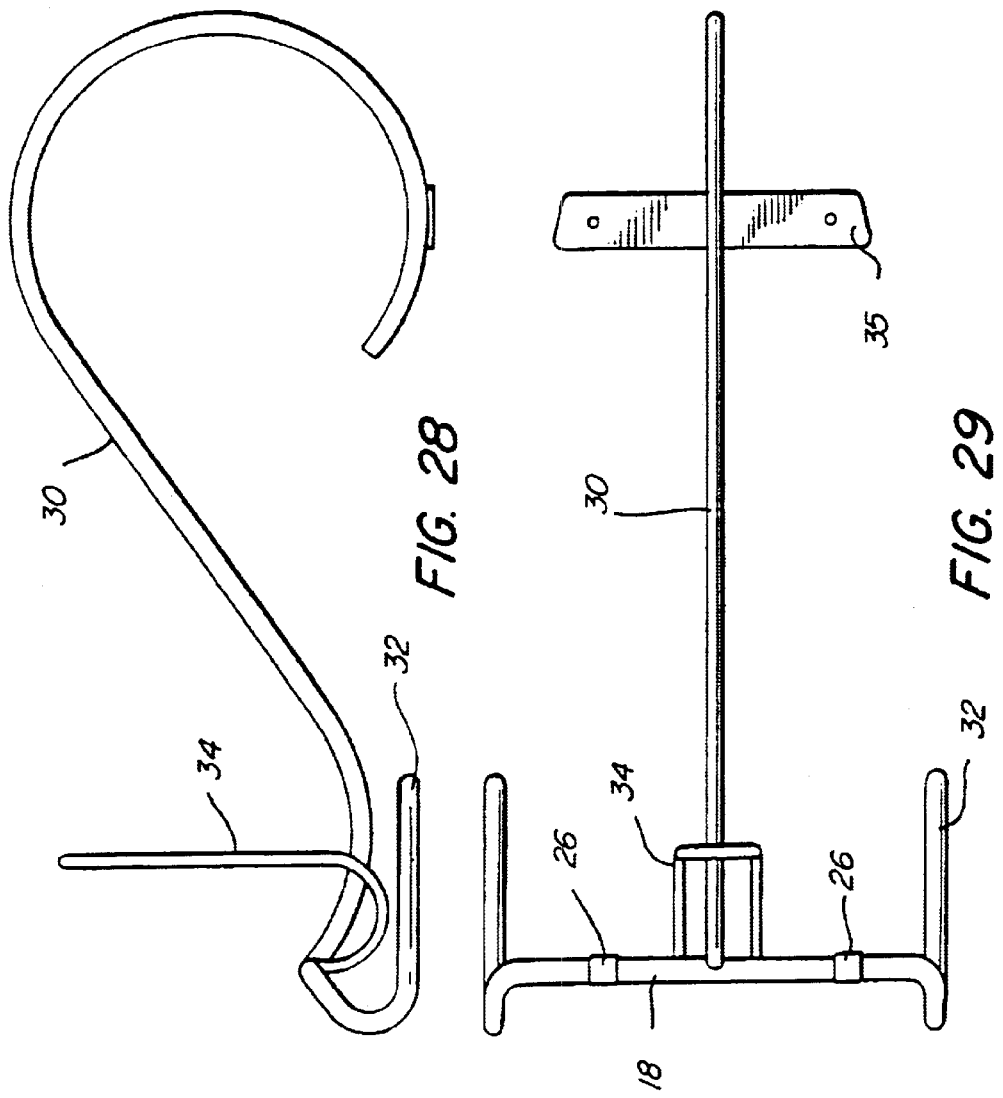

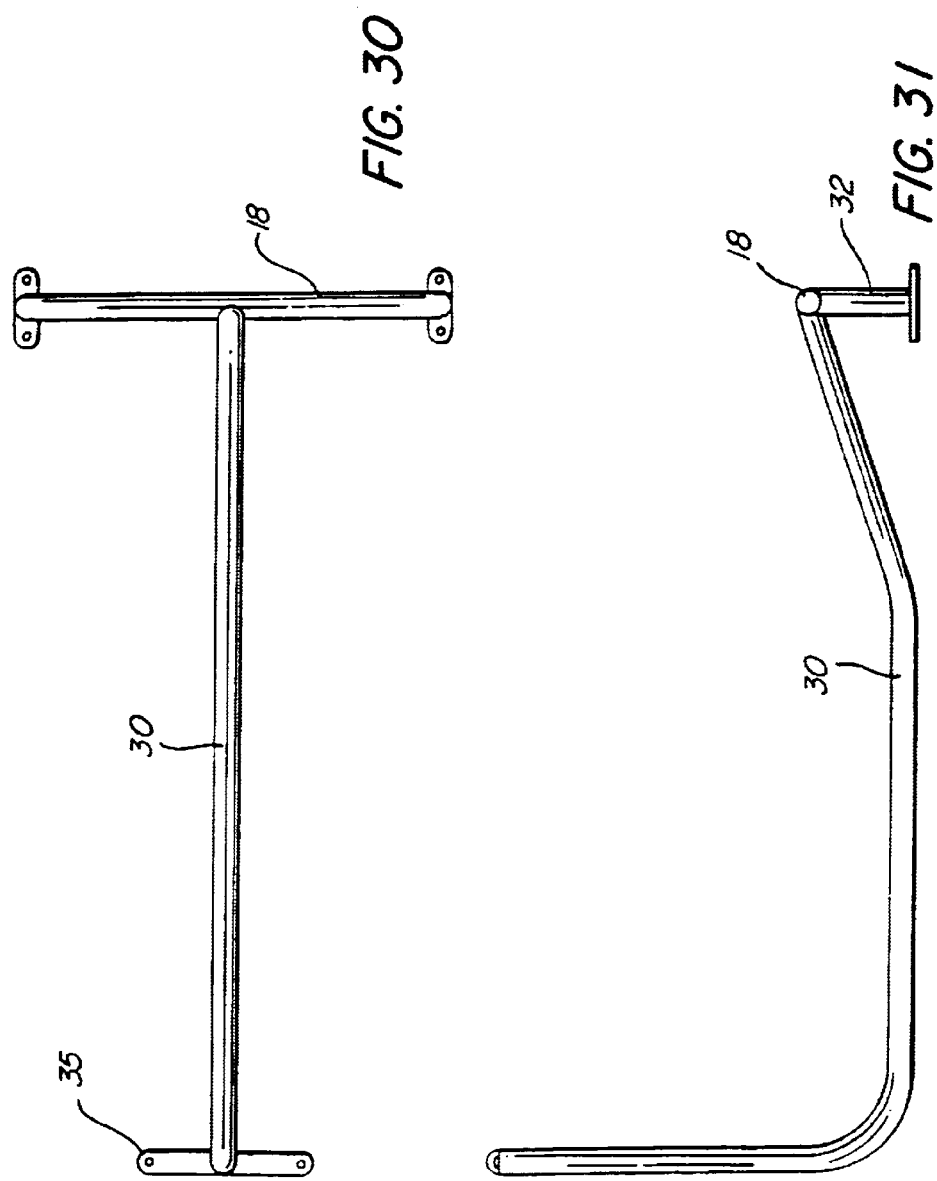

SPONSORED SMALL VEHICLE STORAGE DEVICE

PRIOR APPLICATION

This application is a divisional of U.S. patent application Ser. No. 09/514,174 filed on Feb. 28, 2000, now issued as U.S. Pat. No. 6,505,637, which is a continuation-in-part of U.S. patent application Ser. No. 09/051,472 filed on Sep. 8, 1998, now issued as U.S. Pat. No. 6,068,120.

FIELD OF THE INVENTION

The invention relates to a small vehicle storage device including advertising materials and a method of providing small vehicle storage through private or corporate sponsorship of such small vehicle storage devices and a method of providing same.

BACKGROUND OF THE INVENTION

As municipalities, transit authorities and others are confronted with increasing congestion on their roads and highways, they are being forced to explore alternative modes of transportation, both voluntarily and by government mandate. In an effort to improve air quality and conserve natural resources, various states and municipalities have enacted legislation providing tax incentives encouraging investment in or mandating measures to increase the development and use of alternative transportation. One alternative means of transportation is the use of bicycles. However, people that commute by bicycle encounter a number of problems, including where to store the bicycle and how to protect it from the elements. In addition, bicycles are targets for theft of both the bicycle itself or its components, and vandalism. Providing adequate bicycle storage and security is an important way of encouraging alternative transportation.

Over the years, a variety of products have been developed for securing bicycles. The most common bicycle security systems comprise metal-framed bike racks or posts to which the bicyclist can lock his bicycle using a cable or chain and a lock. Generally, the site owner sustains the cost of purchasing and maintaining the bike rack. Users lock their bicycle frames or front tires to the metal rack or post with their own locks. Such conventional bicycle racks leave the bicycle exposed to the elements and do not stop stripping of components such as seats, saddle bags, pumps, etc. In sophisticated bicycles, some mechanical components are worth hundreds of dollars and are often the targets of thieves. Additionally, use of a conventional bicycle rack and a locked bicycle chain will not stop a determined thief, especially if the bicycle is left unattended for a long period of time.

In addition to the traditional metal-framed bike rack, secure bike storage systems are known. Other systems allow users to place their bicycles inside lockers constructed of laminated plywood or other materials. The site owner sustains the cost of the lockers, their installation, and maintenance. Bicycle owners usually supply their own locks or the units may be equipped with combination or keyed locks. In some instances, bicyclists may rent the lockers for various periods of time. U.S. Pat. No. 3,967,425 to Wolverton et al. discloses a modular unit for storing a single bicycle in an individual locker. The units contain fee-collecting mechanisms so that units can be located at remote locations to provide rentable storage space. A plurality of modular units can be installed to provide a means for storing a plurality of individual bicycles. U.S. Pat. No. 3,973,812 to Poltorak discloses a bicycle storage cabinet. The bicycle is stored in a vertical position. A conventional, coin operated lock secures the access door. The references do not provide a method for supplying the storage cabinets to site owners at no cost to the site owner.

U.S. Pat. No. 3,682,523 to Esposito discloses a kiosk-like structure comprising separate compartments or lockers for storing bicycles. Coin-lock access to the compartments is used to provide income for the municipal authority, which bears the cost of construction and installation of the bicycle storing means. The patent also discloses that the municipal authority may generate additional revenue by affixing advertising literature on the exterior wall surfaces of the kiosk-like structure. The municipal authority bears the cost of construction and installation of the storage structure, though. The reference does not provide a method for supplying the structures to site owners at no cost to the site owner.

While locker systems as in the above-mentioned patents provide relatively secure bicycle storage, they have several drawbacks. Bike lockers are expensive to fabricate, install and maintain. Lockers generally require a permanent concrete pad foundation that is expensive and can require construction permits. Maintenance of the lockers can be costly in that the metal or fiberglass often used in their construction are prone to abuse and graffiti. Aesthetically, the lockers have a sterile presence due to their box-like shape. Additionally, lockers can be safety hazards because of their design. Lockers often create long, contiguous walls which may conceal an individual from a clear line of sight, a concern for many at night an in high crime areas. Furthermore, because lockers offer shelter that is completely closed from sight, they have a propensity for use in illicit activities, such as hiding drugs and bombs. Lockers may also be appropriated by homeless people for shelter.

Other self-standing storage devices have been developed. U.S. Pat. No. 3,861,092 to Dale et al. discloses a Molded Storage Housing For A Motorcycle. The device includes a housing structure for storing motorcycles comprising a floor plate and plastic cover hingedly connected to the floor plate. The housing structure totally encloses the vehicle therein. The reference also discloses a vent selectively closable by a shutter that serves to prevent against rain entering the housing. The vent, when open, permits the escape of vapor from within the structure in humid weather but also can let rain in. U.S. Pat. No. 5,533,616 to Crowfoot also discloses a storage structure for a motorcycle. In Crowfoot, the structure comprises a base and a two-part housing for enclosing a motorcycle. The reference also discloses that the housing may be transparent in order to view the vehicle inside. Neither of the references provides a means for displaying advertisements or a method of supplying the structures to site owners at no cost to the site owner, though.

Other products have been used to display advertisements, such as billboards, benches, and bus stop enclosures. None of the prior art systems, however, are directed to providing inexpensive or free parking for bicyclists and site owners.

What is desired, therefore, are small vehicle storage devices, which are inexpensive or free for bicyclists to use and are secure and protect bicycles and their components from thieves, vandals, and weather. What is also desired is a method for providing small vehicle storage devices which are shipped, installed, maintained, insured, and removed at no cost to the public or the site owners, and are funded by private or corporate sponsorship in exchange for advertisements on, or in conjunction with, the storage structures.

SUMMARY OF THE INVENTION

Accordingly, it is an object of the invention to provide an inexpensive, durable storage device that protects small vehicles from the elements, theft and vandalism.

Another object of the invention is to provide a small vehicle storage device that enables sponsors to display advertisements thereon.

Yet another object of the invention is to provide a method of providing small vehicle storage devices to site owners at no cost to the site owners using funds received from sponsors in return for advertising space in conjunction with the small vehicle storage devices.

These and other objects of the invention are achieved by provision of a durable, secure small storage device that protects small vehicles from the elements and theft, as well as provides a platform upon which sponsors can advertise. Sponsors can include any entity that seeks to advertise or convey a specialized message such as corporations, universities, non-profit organizations, individuals, or governmental entities. The storage device includes a frame having a cross rod component and an upwardly extending rod component for laterally supporting a vehicle. A rigid shell is pivotally connected to the frame at the cross rod component and provides shelter and protection for the vehicle stored inside. In another embodiment, the invention further includes an advertising means for displaying advertisements of sponsors.

In another aspect, the invention comprises a method of providing site owners with inexpensive, secure, small vehicle storage devices. The method includes the steps of receiving orders from site owners requesting small vehicle storage devices, installing and maintaining the storage devices at the site owners site, and financing the installation and maintenance of the storage devices using funds received from sponsors in return for advertising space in conjunction with the storage devices. The funds received from the sponsors can also be used for insuring the storage device and the removal of the storage devices from the sites when necessary.

The invention and its particular features and advantages will become more apparent from the following detailed description of the invention considered with reference to the accompanying drawings.

BRIEF DESCRIPTION OF THE DRAWINGS

FIG. 7 is a side view of the embodiment shown in FIG. 6 of the enclosure in the open position.

FIGS. 18 and 19 are side and plan views, respectively of the enclosure of FIG. 1 with an alternate embodiment of the base and pivot structures in accordance with the invention.

FIGS. 24a–27a and 24b–27b are front and side views, respectively, of alternate embodiments of the support leg structures of the base structure of the enclosure of FIG. 1 in accordance with the invention.

FIGS. 28 and 29 are side and plan views, respectively, of an embodiment of the base structure of the enclosure of FIG. 1 in accordance with the invention.

FIGS. 30 and 31 are plan and side views, respectively, of another embodiment of the base structure of the enclosure of FIG. 1 in accordance with the invention.

DETAILED DESCRIPTION OF THE INVENTION

Figure 1:
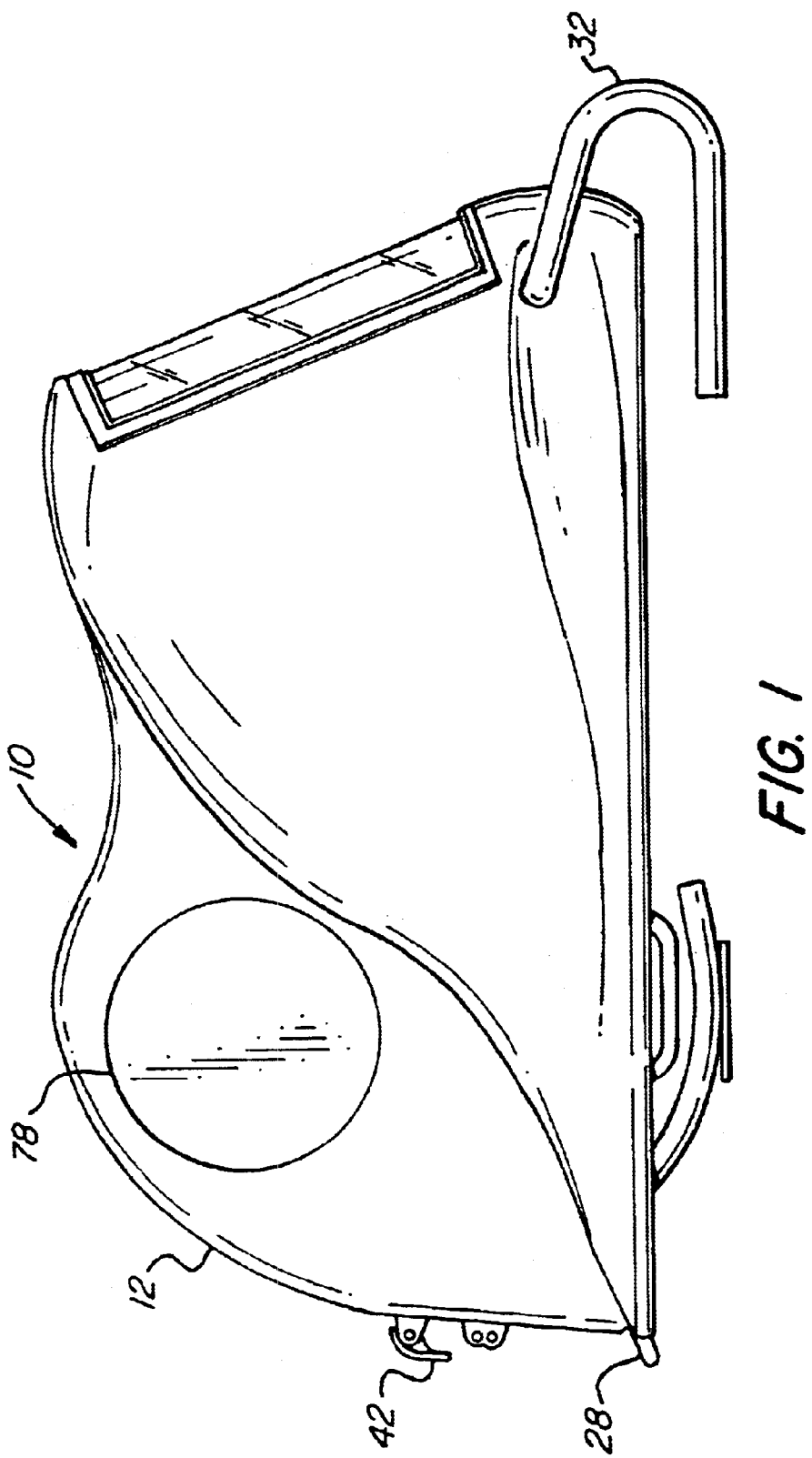
FIG. 1 is a side view of the small vehicle enclosure in the closed position in accordance with the invention.
Figure 2:
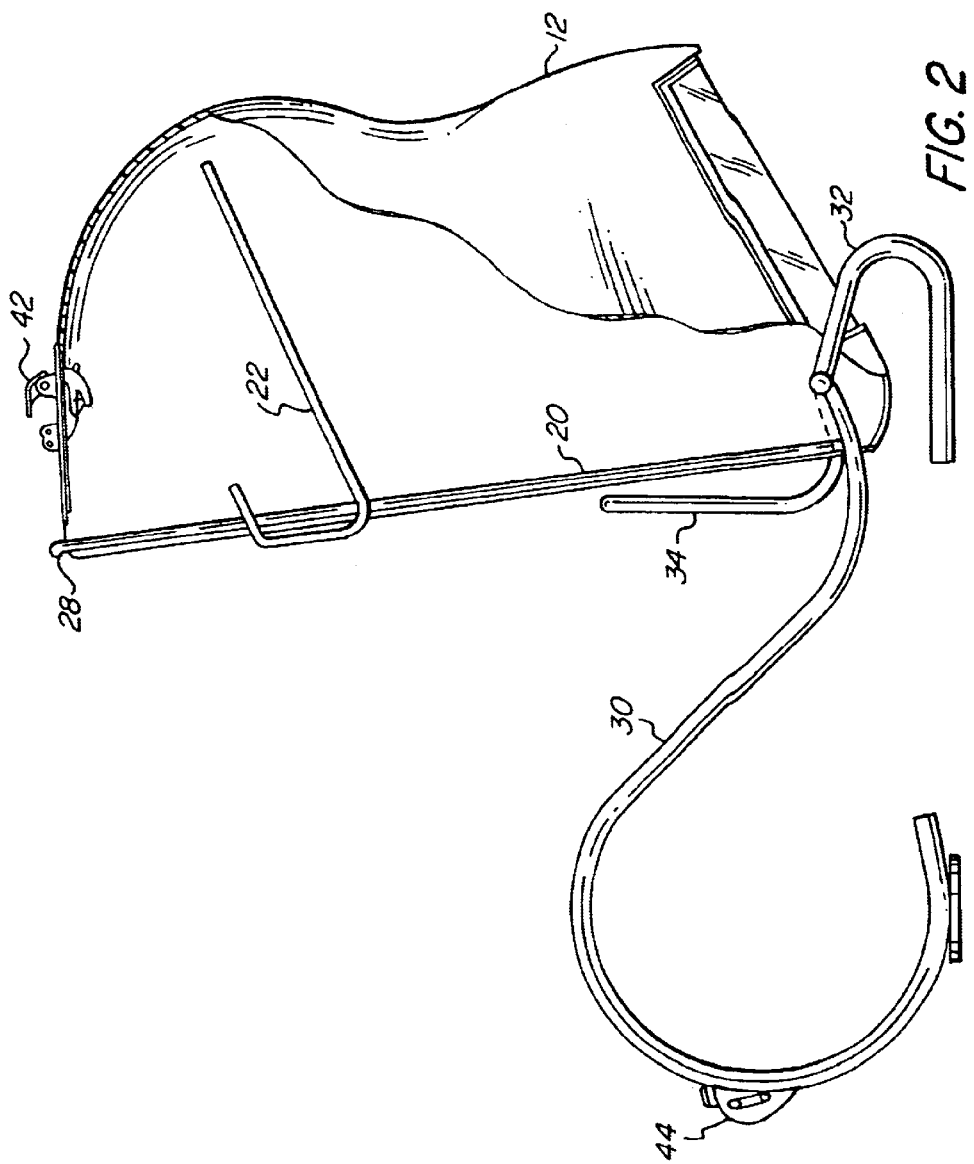
FIG. 2 is a side view of the small vehicle enclosure of FIG. 1 in the open position in accordance with the invention.
Figure 3:
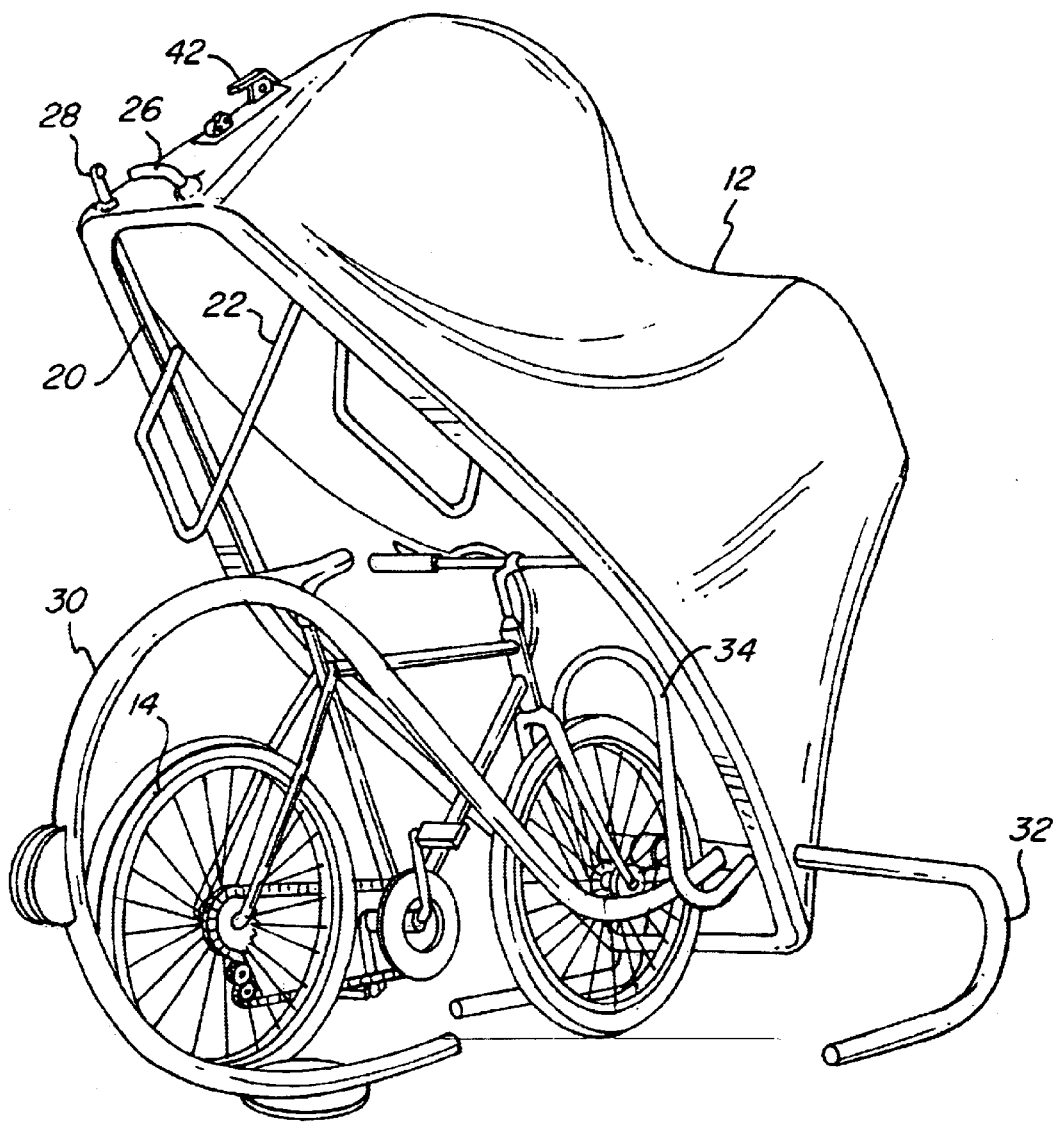
FIG. 3 is an isometric view of the small vehicle enclosure of FIG. 1 in the open position showing the enclosure with a bicycle therein in accordance with the invention.
Figure 4:
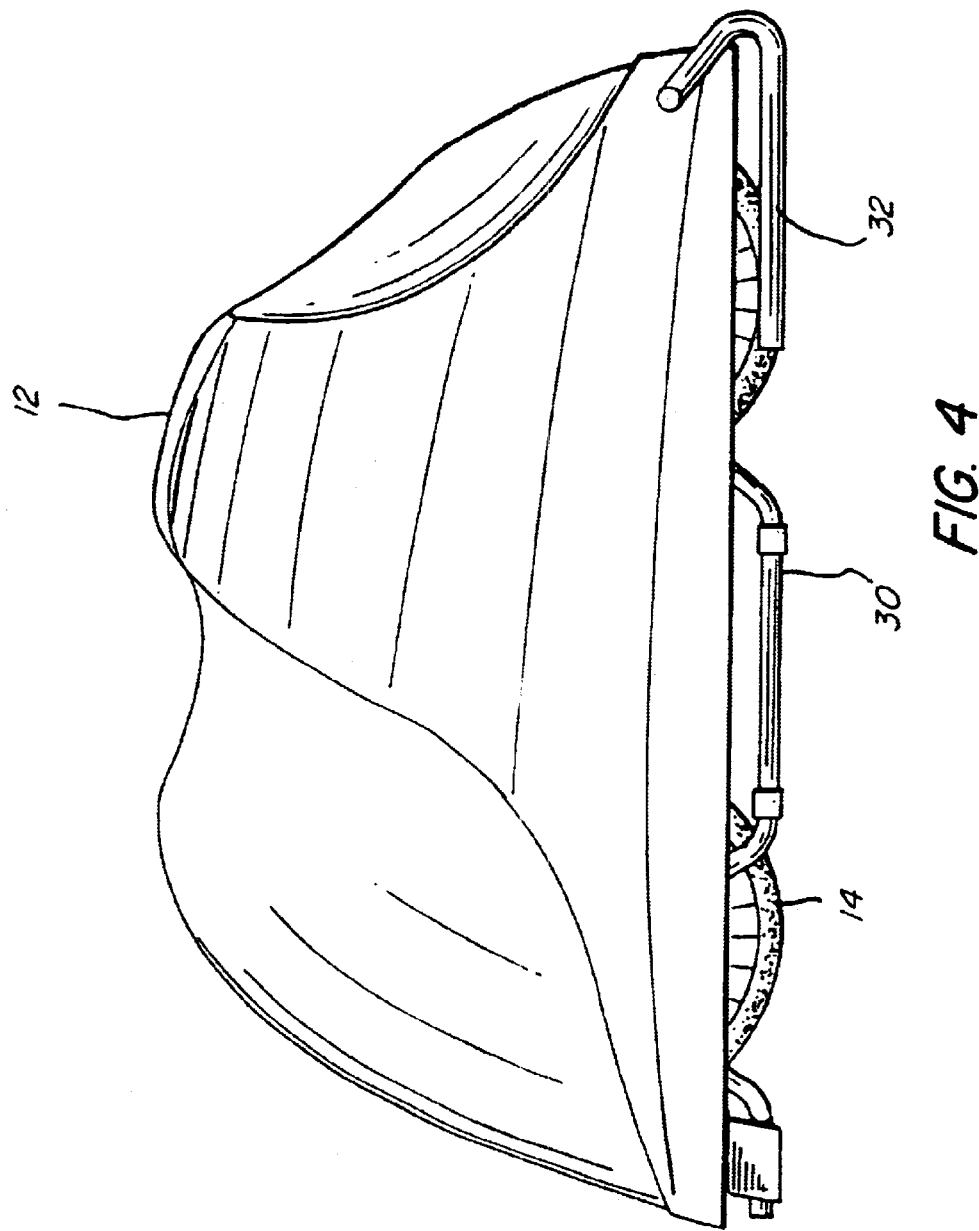
FIG. 4 is a side view of another embodiment of the enclosure of FIG. 1 in the closed position in accordance with the invention.
Figure 5:
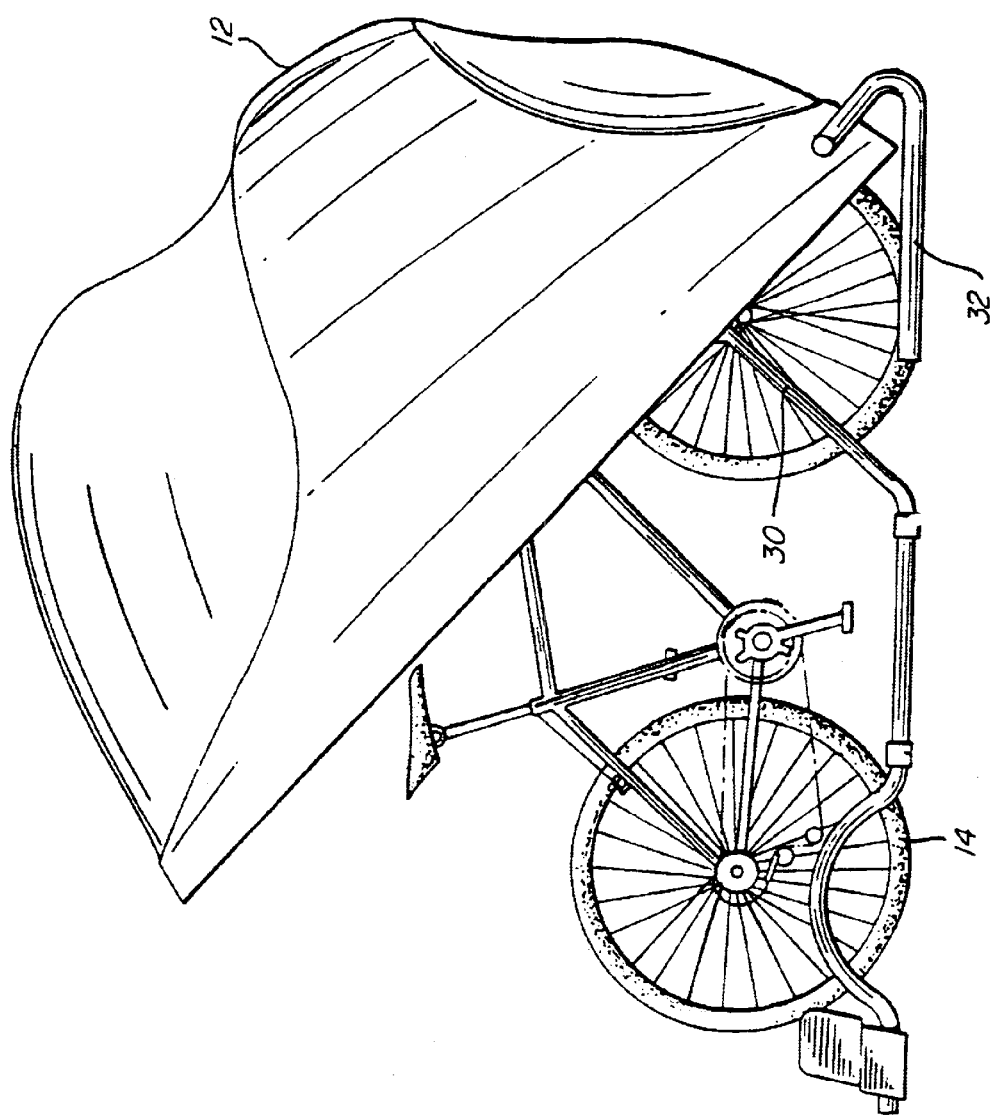
FIG. 5 is a side view of the embodiment shown in FIG. 4 of the enclosure in the open position.
Figure 6:
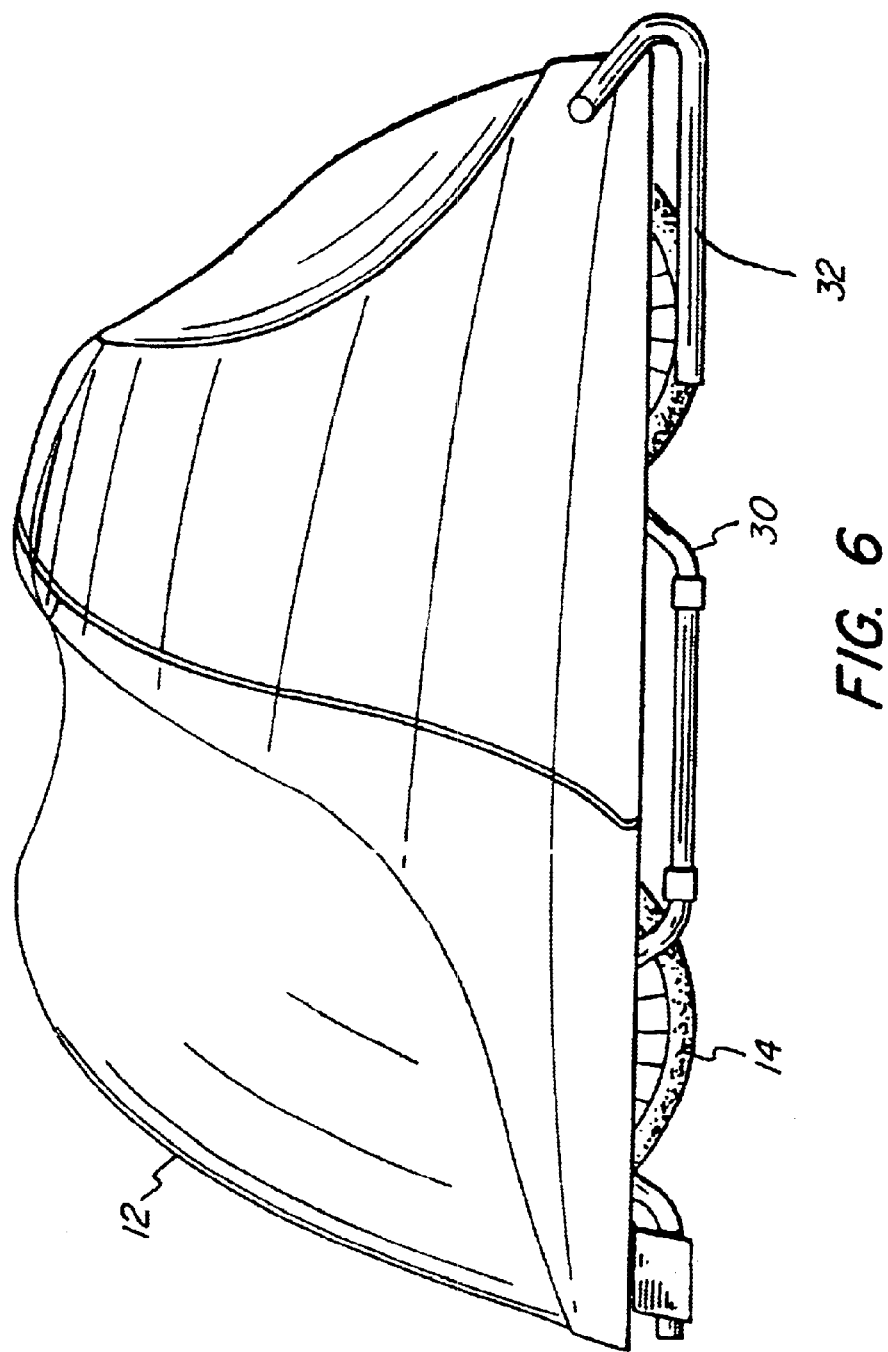
FIG. 6 is a side view of another embodiment of the enclosure of FIG. 1 in the closed position in accordance with the invention.
Figure 10:
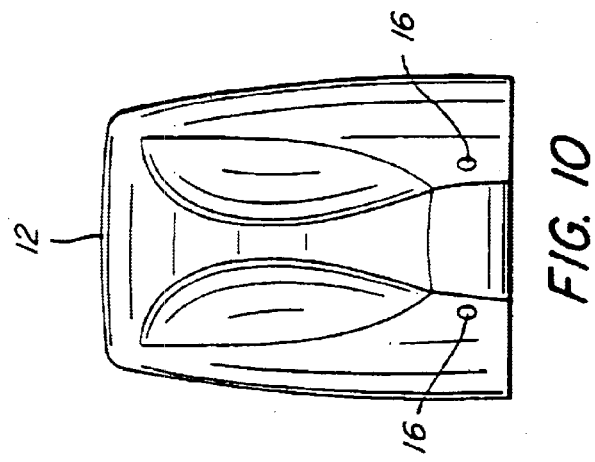
FIGS. 8, 9, and 10 are side, plan, and front views, respectively, of the shell of the enclosure as shown in FIG. 6.
Figure 8:
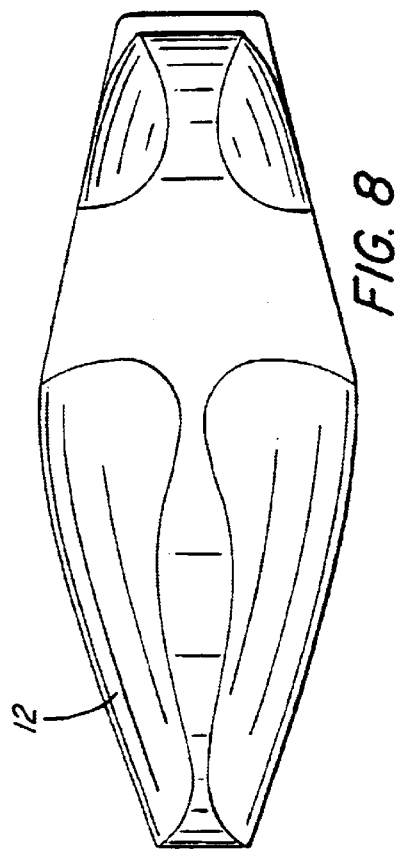
Figure 9:
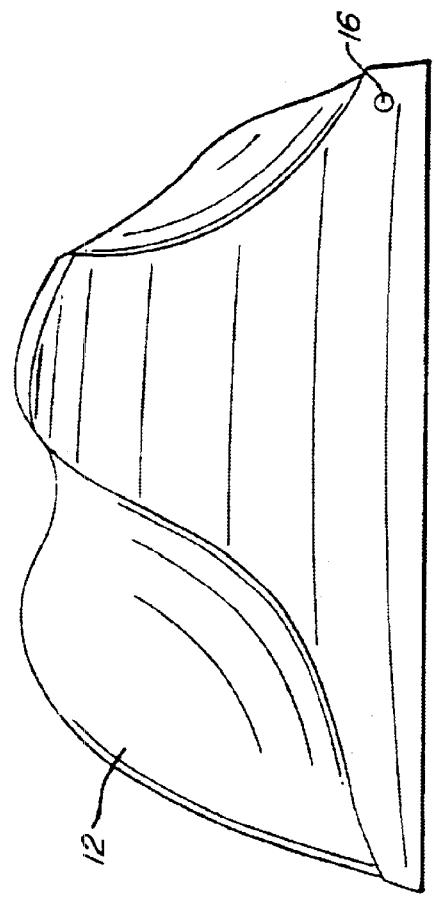
Figure 11:
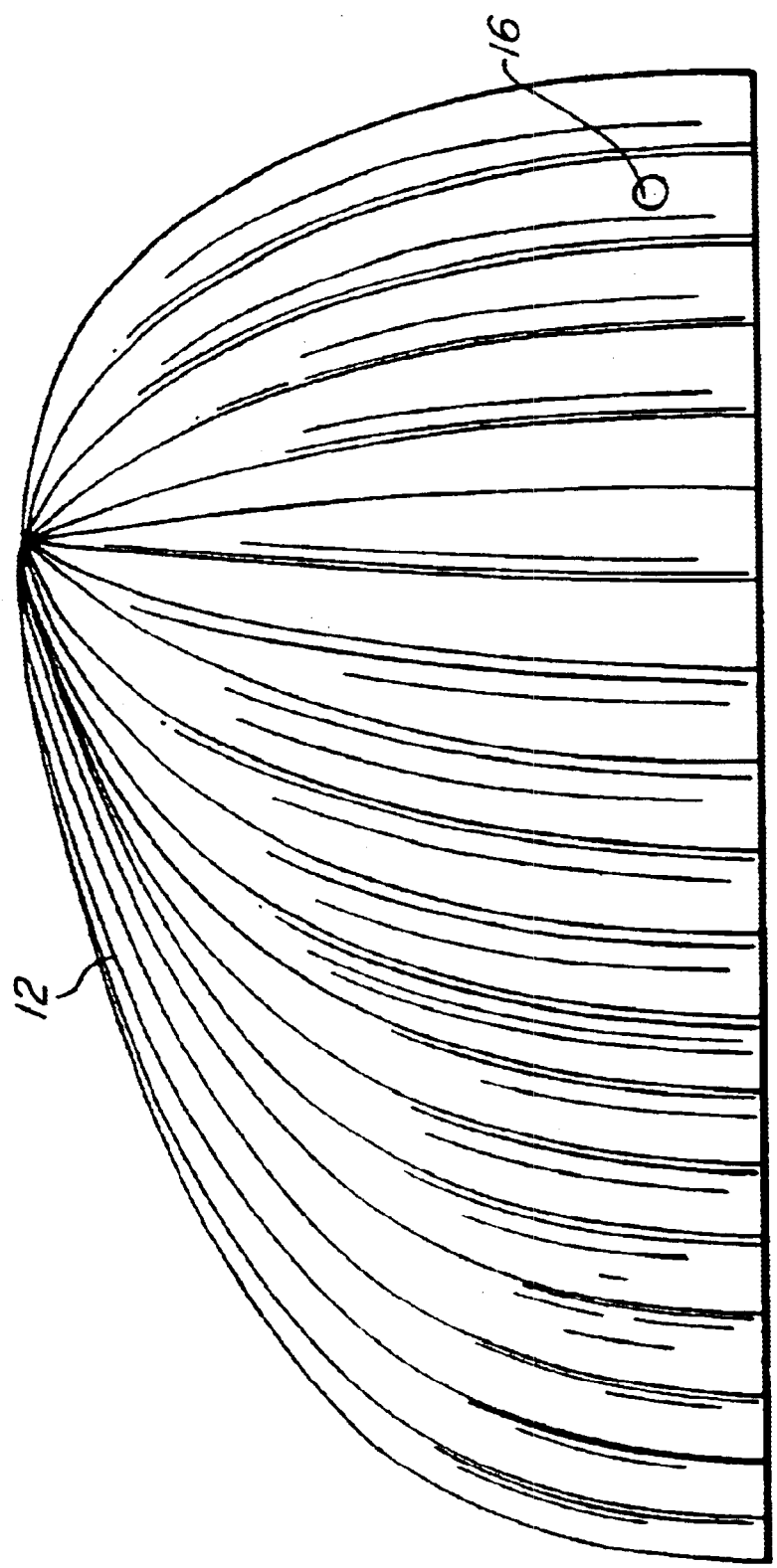
FIGS. 11, 12, and 13 are side views of alternate embodiments of the shell of the enclosure of FIG. 1 in accordance with the invention.
Figure 12:
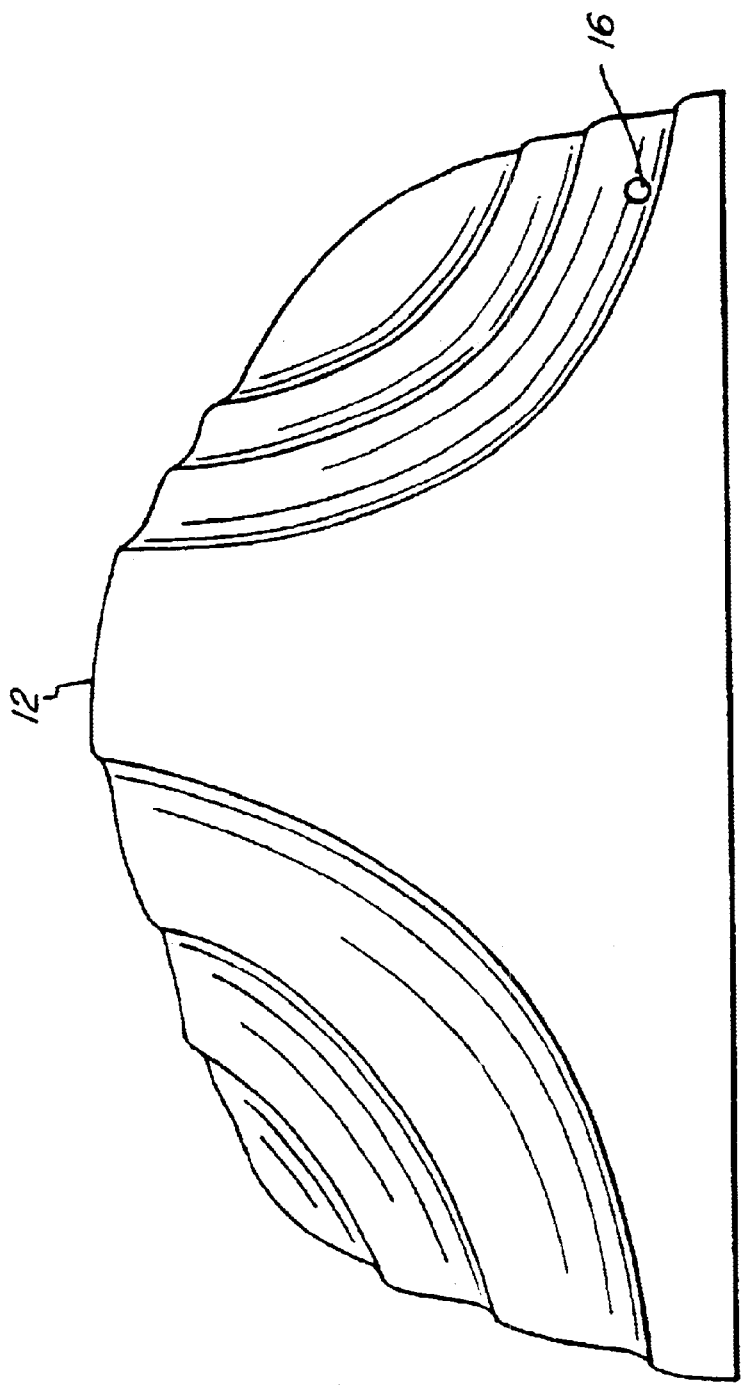
Figure 13:
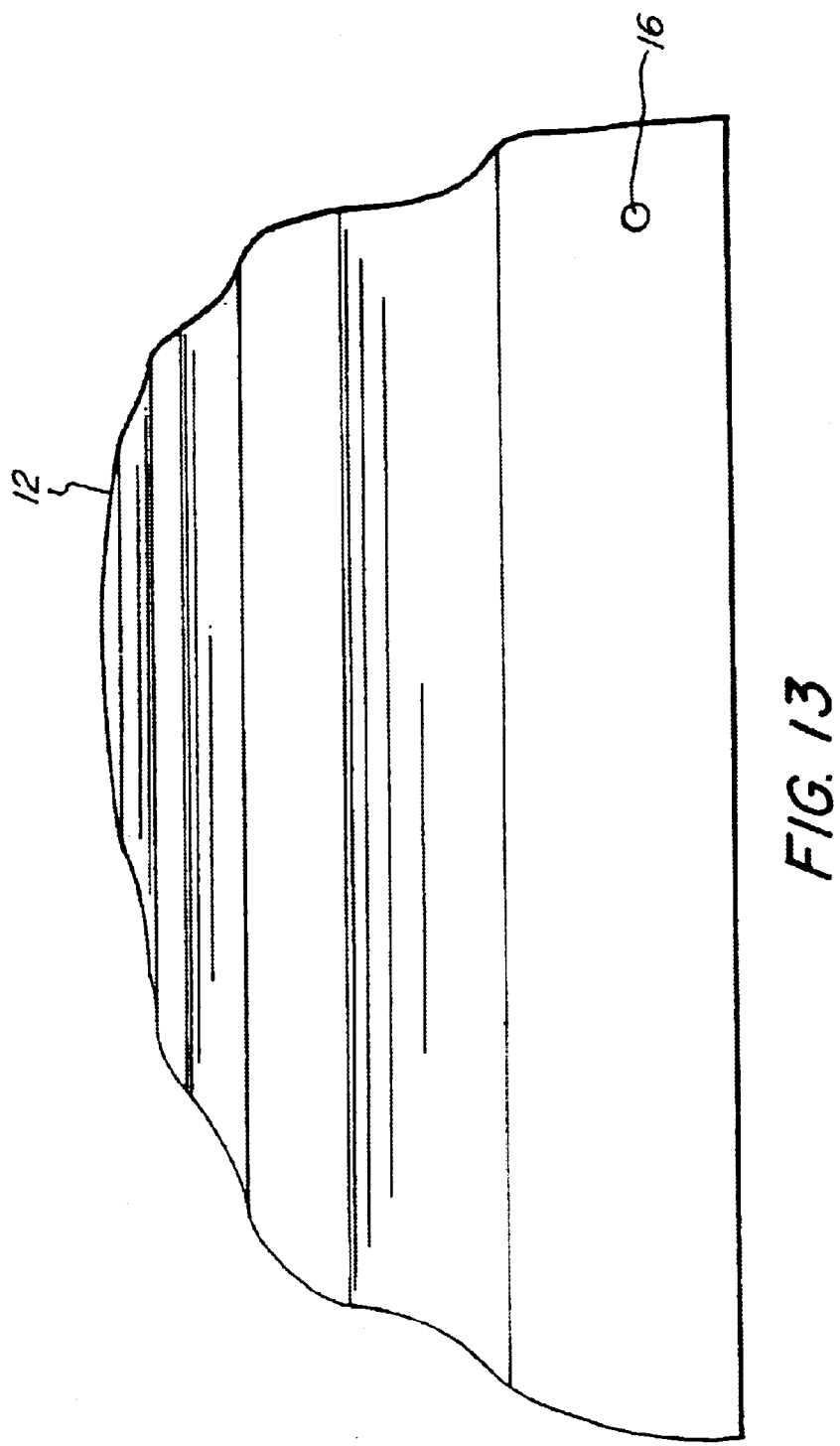

FIGS. 1–3 depict an enclosure 10 for a small vehicle in accordance with the invention. The enclosure 10 consists of a base for supporting the vehicle and a shell 12 pivotally mounted to the base and movable between a closed position, as shown in FIG. 1, and an open position, as shown in FIG. 2. The enclosure 10 further includes a means for displaying advertisement. Alternate embodiments of the enclosure are illustrated in FIGS. 4–7.

The shell 12 is formed to enclose a small vehicle, such as a bicycle 14, to protect it from vandalism and theft and to shield it from the natural elements. The shell 12 only substantially encloses the vehicle in order to allow the inspection of the interior of the enclosure 10 to avoid any illicit use as described above. The shell 12 may have holes 16 that allow the connection of the shell 12 to the base and also allows the shell 12 to be rotated around a cross rod component 18 so that the shell 12 can be raised and lowered over the vehicle to be protected. Additionally, the shell 12 can be provided with view holes (not shown) in the body of the shell 12 that would allow inspection of the interior and contents of the enclosure 10.

Plastic is an appropriate and preferred material for manufacturing the shell 12 because plastic is an extremely durable substance, an important quality in for this application. Plastic is also capable of resisting the elements and providing security for the vehicle to be protected. Additionally, plastic is essentially vandalism resistant. Preferably, the shell 12 is formed of polyethylene, which has a high compression and tension strength relative to its mass, making it extremely impact resistant. Polyethylene is also virtually impervious to paint, dyes and inks, an important quality when graffiti is a concern. Molded recycled plastic currently is the most economical means of producing a durable shell 12.

Materials such as fiberglass and other composite materials may be used to construct the shell 12. It is also apparent that other materials may be used, such as metal or wood or other materials that will be apparent for substitution, although at present time these are considered less durable. The choice of material for the shell 12 depends on the criteria of durability, resistance to elements, and weight constraints. The shell 12 can also be impregnated with various substances known to those skilled in the art prior to the molding process or applied to the shell 12 during the manufacturing process to impart various desired qualities to the shell 12, such as color, added strength, and fire resistance.

The design of the shell 12 employs compound or opposing curves to structurally maximize its strength, as it is known and understood by those in involved in plastics and materials design. Compound curves are used to make the shell 12 structurally stronger than a flat plane. The strength of a curved plane is maximized within certain dimensions in reaction to certain forces. Compound curves give the surface multidimensional rigidity and strength while minimizing material. The specific curves used in the shell 12 for a given utility depends in part on the shape and size of the of the vehicle to be stored and may be selected according to aesthetic choice of the designer. It is understood that the shell 12 could be designed without compound curves. Several alternate embodiments of the shell design are shown in FIGS. 8–13.

The amount of material used to make the shell 12 may be minimized without sacrificing strength through the molding of portions of the shell 12 that cause the curvilinear design to be an efficient use of space. Portions can be made to bow outwardly from the interior of the shell 12, bow inwardly toward the interior of the shell 12, or a combination of both. This allows a number of the enclosures 10 to be clustered tightly together thus maximizing the number of enclosures 10 that can be installed within a given site. When not in use or being shipped, the design of the shells 12 allows multiple shells to be nested within one another to effectively reduce shipping volumes. The design of the shell 12 and its form may also be selected to provide an efficient shape for the molding process and to allow easy mold release.

The design of the shell 12 need not, but preferably should, reflect the shape of the vehicle to be stored inside. Different designs could be employed for different vehicles such as motorcycles, snowmobiles and personal watercraft. Other embodiments would have analogous geometric compositions utilizing compound curves to provide rigidity to the shell 12 structure and vary in their proportions as to accommodate the design of the vehicle inside with efficient use of materials. In addition, the shells and bases can be adapted to protect more than one vehicle at a time. As noted above, it is understood that there are many possible variations to the design of the shell 12 and several alternate designs are illustrated in FIGS. 8–13.

The shell 12 can also be reinforced by various methods in order to impart strength. Bars of various materials can be implanted in the shell 12 in order to frustrate efforts by thieves to cut through the shell 12 with blades or other means. The shell 12 may also include a structural support frame, discussed below. In addition to adding support to the shell 12, the support frame adds another layer of protection by covering the vehicle with a structure separate and apart from the shell 12. Thus, even if the shell 12 is removed, the vehicle remains relatively secure.

Figure 14:
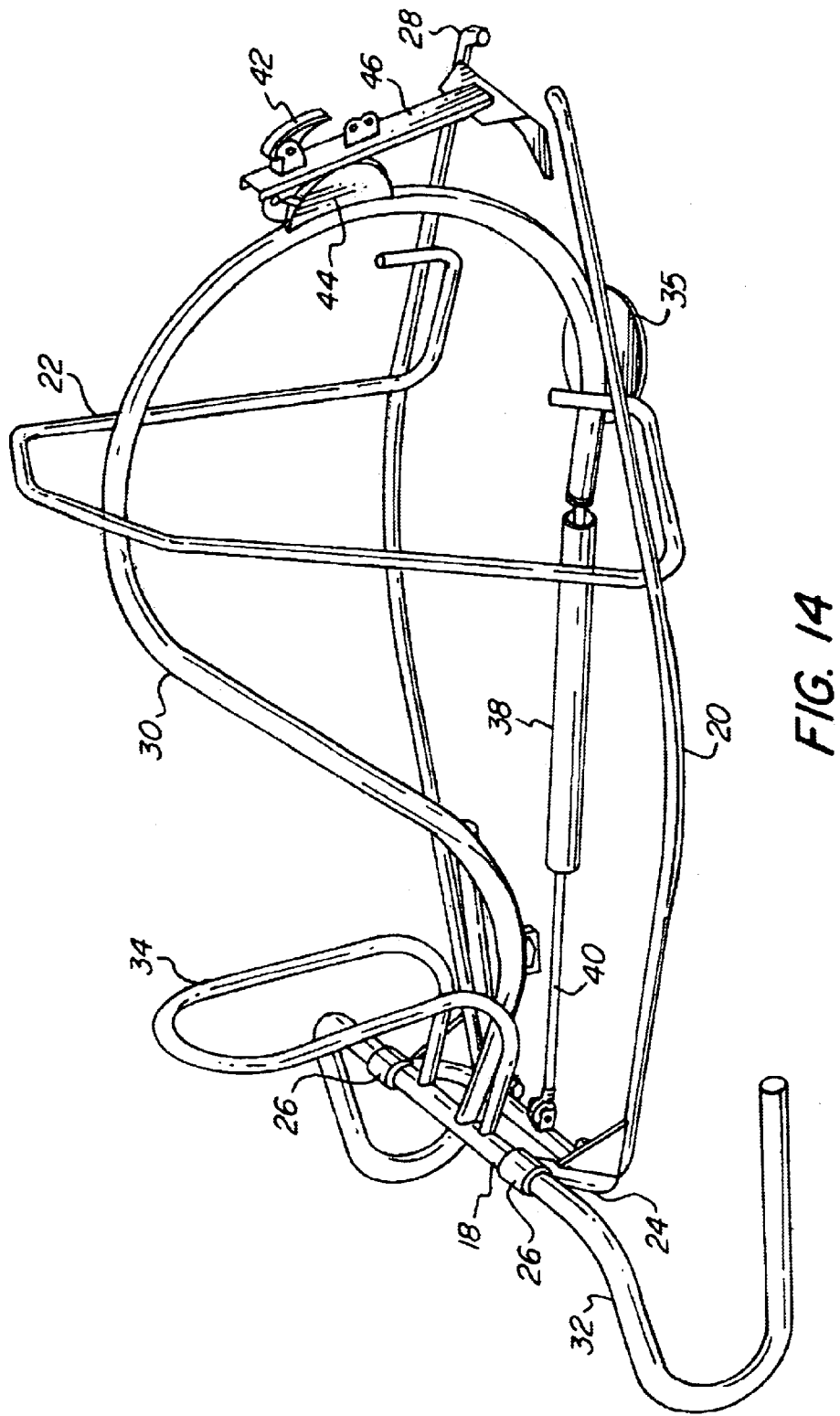
FIG. 14 is an isometric view of the frame structure of the enclosure of FIG. 1 in accordance with the invention.
Figure 17:
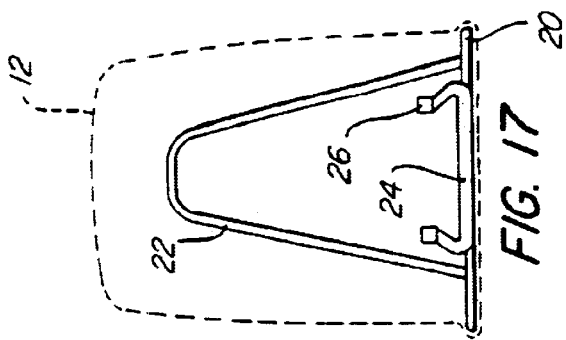
FIGS. 15, 16, and 17 are side, plan, and front views, respectively, of another embodiment of the support structure of the enclosure of FIG. 1 in accordance with the invention.
Figure 15:
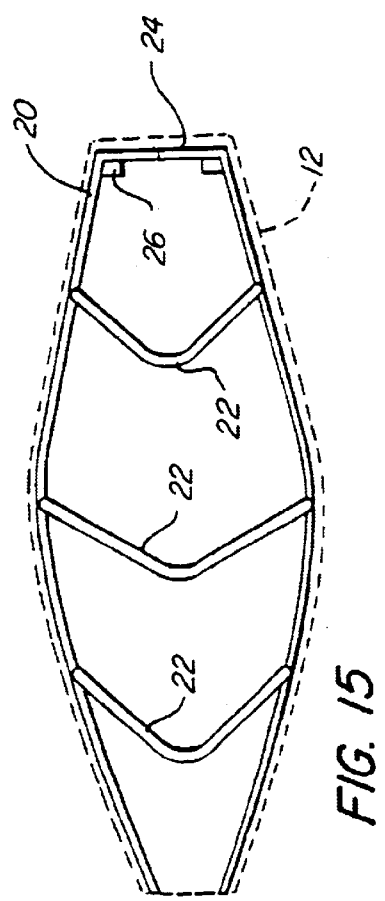
Figure 16:
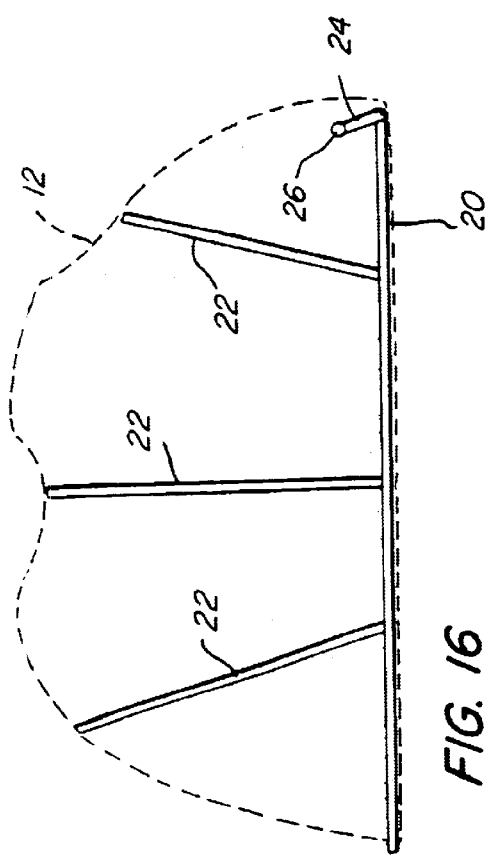
Figure 20:
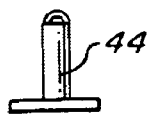
FIGS. 20 and 21 are side views of an alternate embodiment of the base structure of the enclosure of FIG. 1 in accordance with the invention.
Figure 21:
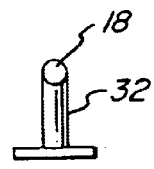
Figure 22:
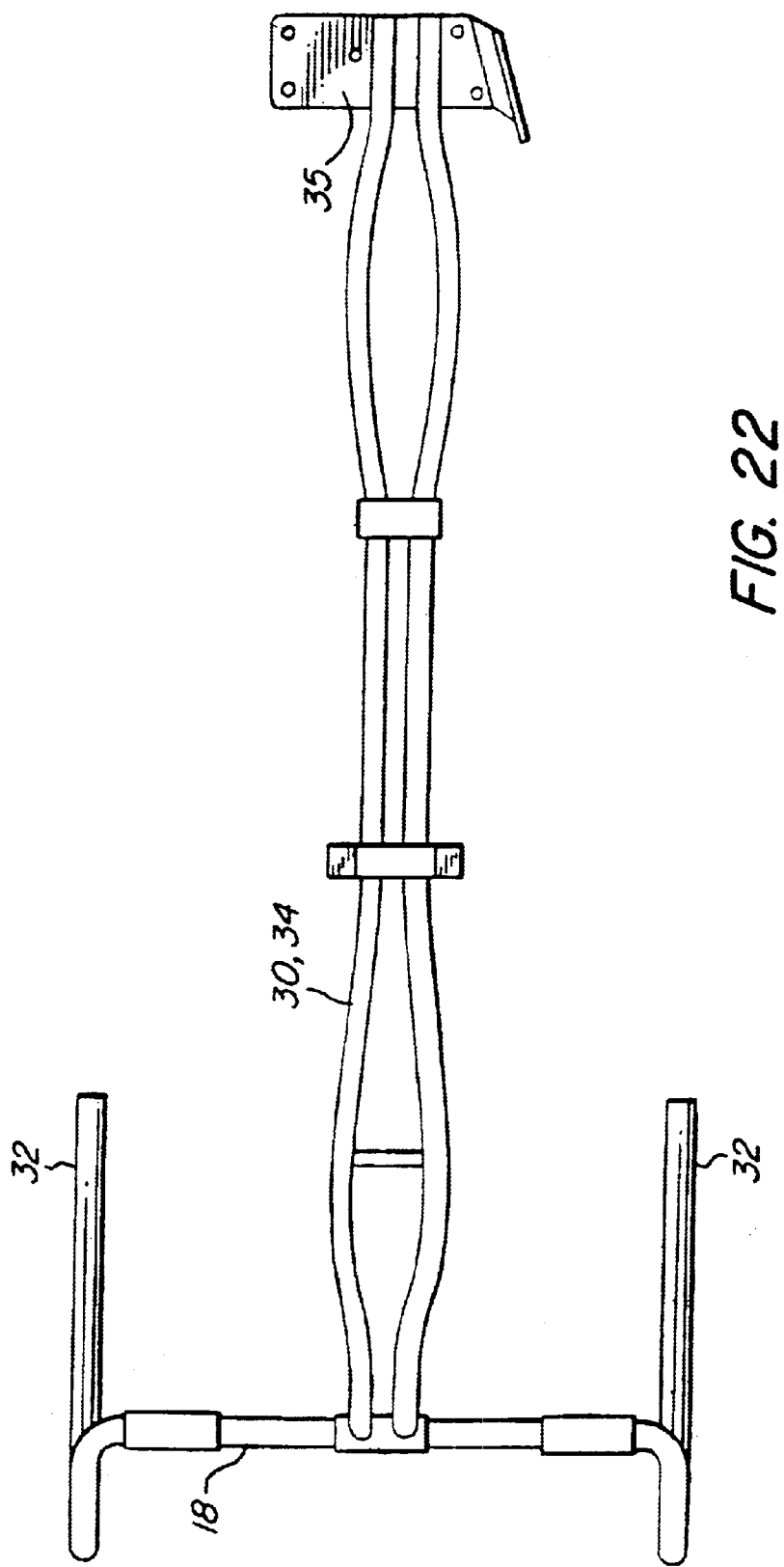
FIG. 22 is a plan view of another alternate embodiment of the base structure of the enclosure of FIG. 1 in accordance with the invention.
Figure 23:
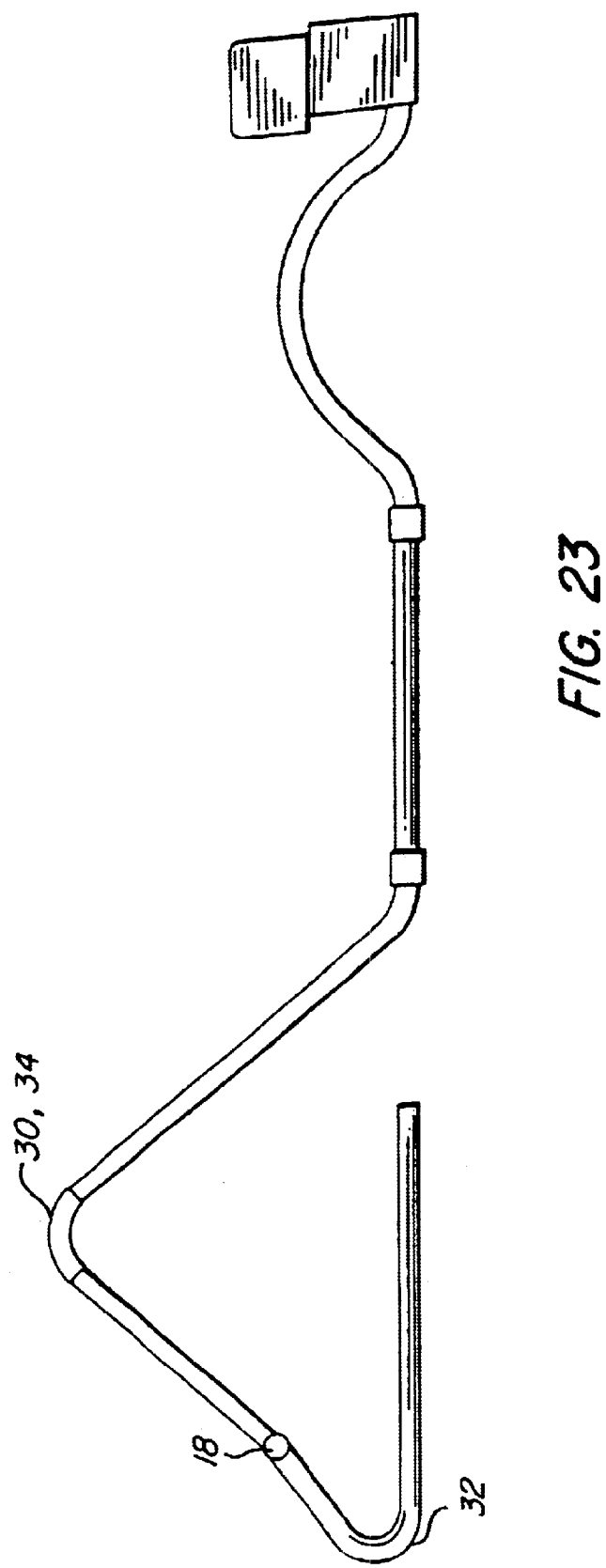
FIG. 23 is a side view of an embodiment of the base structure shown in FIG. 22.
Figure 32:
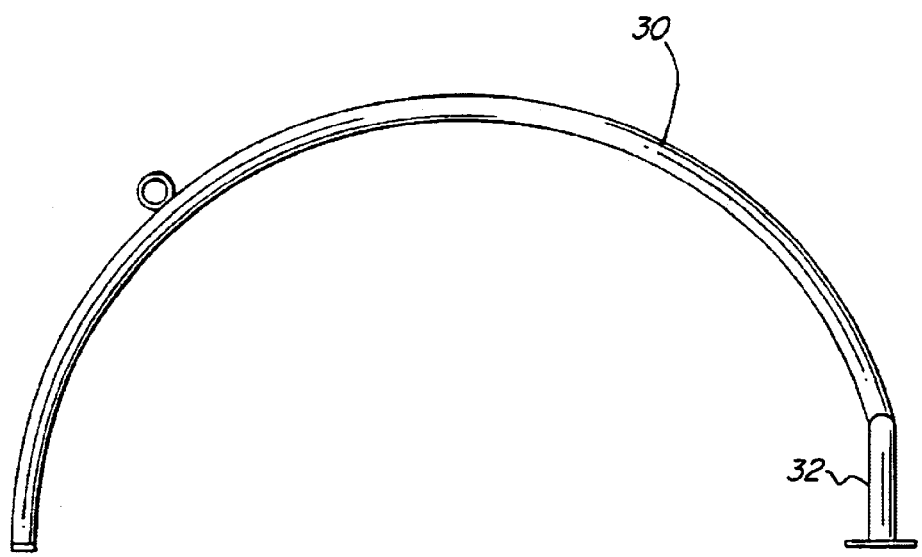
FIG. 32 is a side view of another embodiment of the base structure of the enclosure of FIG. 1 in accordance with the invention.
Figure 33:
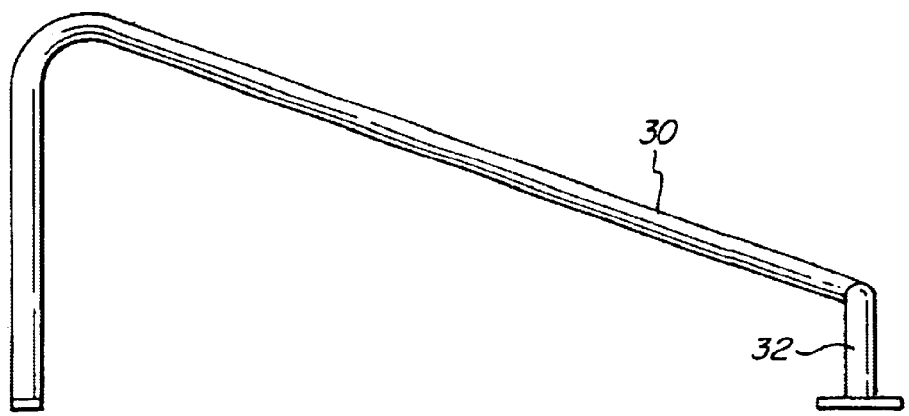
FIG. 33 is a side view of another embodiment of the base structure of the enclosure of FIG. 1 in accordance with the invention.

The structural support frame, as shown in FIG. 14 comprises a skirt frame 20 that extends around the inner periphery of the bottom edge of the shell 12. The skirt frame 20 may also be embedded in or is enveloped by the bottom edge of the shell 12. Preferably, at least a portion of the skirt frame 12 extends below the bottom edge of the shell 12 to define a gap between the shell 12 and surface on which the enclosure 10 stands. The gap permits inspection of the contents of the enclosure 10 to deter illicit activities that might occur in the enclosure 10. This skirt frame 20 can be a unitary piece, or separate pieces configured in a way in order to impart structural support to lower edge of the shell 12. Extending from or connected to the skirt frame 20 can be one or more shell support components 22 that provide support to the top of the shell 12 and further protect the vehicle inside. An embodiment showing multiple shell support components is shown in FIGS. 15–17. The shell support components 22 may also be embedded in either the side or top of the shell 12, or both, which allows it to further impart structural strength to the shell 12. Alternatively to a portion of the skirt frame 20 extending below the bottom edge of the shell 12, the shell support component 22 may extend below the bottom edge of the shell 12 to define the desired gap as shown in the Figures. It is understood that the shell support components and/or the skirt frame may be located internal or external to the shell 12 and embedded or not embedded into the shell material depending on the desired design and aesthetic attributes desired.

The structural support frame is pivotally attached to a cross rod component 18, discussed below, to permit the shell 12 to be opened and closed. The support frame may also include a pivot component 24 to which the support frame and shell 12 are attached to ease opening and closing of the shell 12. The pivot component 24 is preferably attached to the cross rod component 18 by collars 26 to allow the shell 12 to rotate about the cross rod 18, but it is understood that the pivot component may be attached to the cross rod component by any suitable means allowing rotation between the parts. Alternatively, the enclosure need not include a cross rod component, and the shell may pivot about any suitable means or axis. Other embodiments are shown in FIGS. 18 and 19. The skirt frame 20 may also contain at least one handle component 28 extending from the skirt frame 20 out through the shell 12. The handle component 28 provides a handle on the exterior of the shell 12 to facilitate opening and closing the enclosure 10. Alternatively, other known handles may be attached to the shell or support frame to assist the user in operating the device.

FIG. 14 also depicts an embodiment of a base structure in accordance with the invention. The function of the base is to support the shell 12, align the vehicle in the enclosure 10, and allow the vehicle to stand upright when stored in the enclosure 10. The base basically includes a cross rod component 18 and an upwardly extending rod component 30, attached to the cross rod component 18, for flanking the side of a vehicle to provide lateral support thereto. The cross rod component 18 also provides a location for the shell 12 to be pivotally attached to the base. In this particular embodiment, the shell 12 attaches to the base via the pivot component 24, but it should be recognized that the shell 12 may attach to the cross rod 18 by any suitable means, such as directly using reinforced holes in the shell 12 or by pivotally attaching the skirt frame 20 to the cross rod 18. Alternate embodiments of a base structure are shown in FIGS. 20–23.

Leg components 32 may be attached to the cross rod component 18 to support the enclosure 10 and provide anchor points between the enclosure and the surface upon which the enclosure 10 is located. Preferably, when assembled with the shell 12, the leg components 32 extend from the cross rod component 18 and out through holes 16 in the shell 12 and can be shaped depending upon the designer's preferences and choices. It is understood that a wide variety of leg components may be used in this application that may or may not extend through the shell. Several alternate embodiments of the leg components 32 are shown in FIGS. 24a–27a and 24b–27b. The leg components 32 may also be modified to enable multiple enclosures 10 to be ganged together with one another for additional security. Additionally, the leg components 32 may include a means for securing the enclosure to the surface upon which it is located. Thus, the enclosure may be mounted on a horizontal or vertical surface depending on the location and/or desires of the location owner.

An embodiment of the upwardly extending component 30 of the base is shown in FIGS. 28 and 29. The upwardly extending component 30 provides lateral support for the vehicle stored in the enclosure 10 and also properly aligns and positions the vehicle. In this embodiment, the upwardly extending component 30 consists of a pair of opposing smooth radius curves to form an "S" curve. An alignment member 34 may also be included to further aid in the support and alignment of the vehicle. The alignment member 34 is attached to the cross rod component 18 and shaped to receive a wheel of a vehicle to properly position the vehicle within the enclosure 10 and further support the vehicle in an upright position. It is understood that the upwardly extending component may be of any suitable design that would flank the side of a vehicle in the enclosure to provide lateral support thereto. Several alternate embodiments of the upwardly extending component are illustrated in FIGS. 30–33. The upwardly extending component may further include a base plate 35 connected thereto for providing another anchor point for the enclosure. The base plate can include a means for securing the enclosure to the surface upon which it is located to further increase the security of the device.

Figure 34:
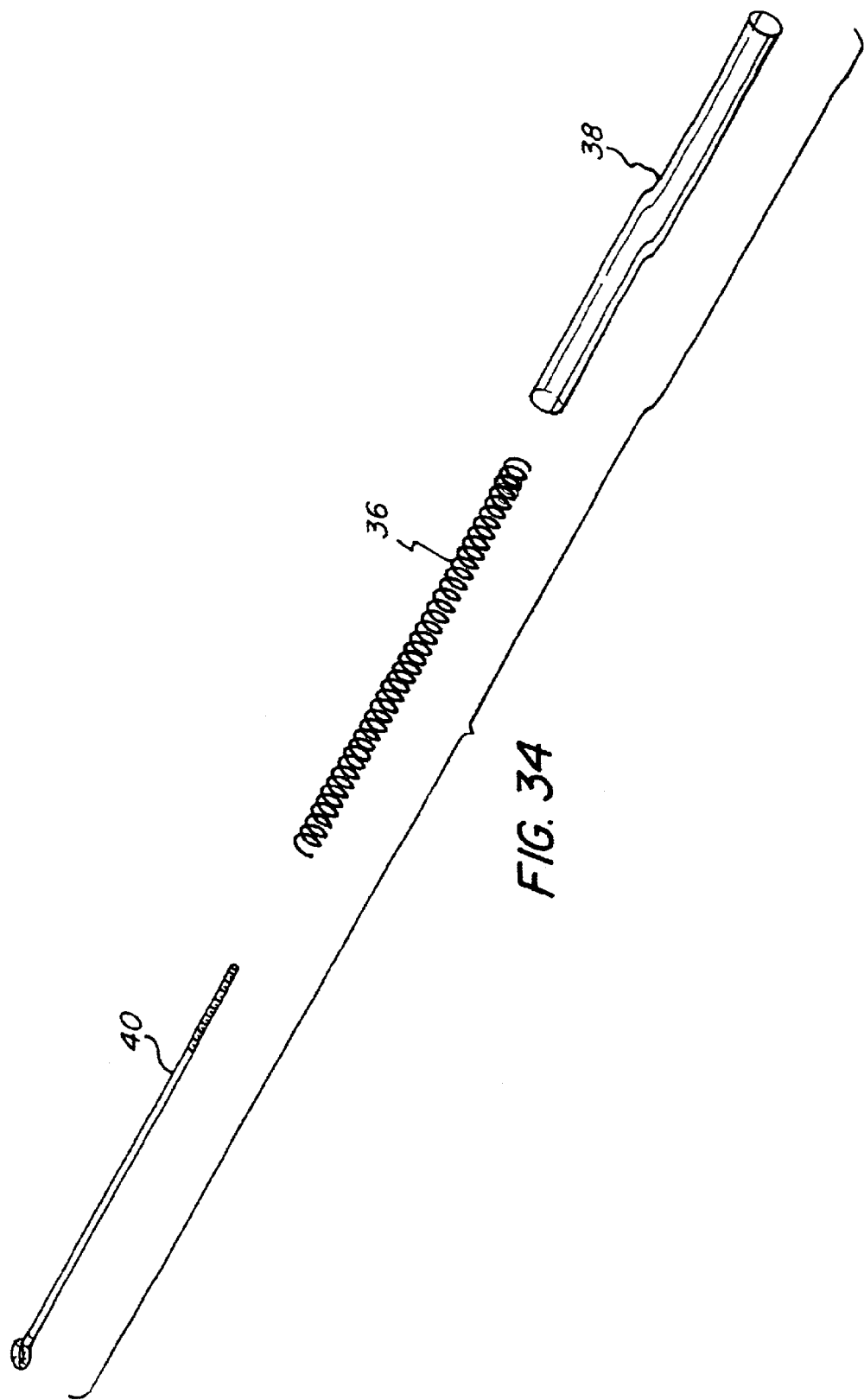
FIG. 34 is an exploded view of the assist mechanism shown in FIG. 14 in accordance with the invention.

The enclosure 10 may also include an assist mechanism to ease the moving of the shell 12 between the open position to the closed position. The assist mechanism may be a spring-loaded or pneumatic hinge connecting the shell 12 to the base. It is understood that any mechanism that would aid in the lifting and lowering of the shell 12 can be utilized. Other mechanisms include, without limitation, hydraulic or pneumatic struts, counterbalancing, elastics, torsion bars, tension springs, compression springs, torsion springs, and/or leaf springs. The use of a compression spring is shown in FIG. 34. As shown, a compression spring 36, contained within a spring tube 38, acts to exert a constant pull on the pivot component 24 of the skirt frame 20 through an actuator arm 40. The actuator arm 40 is pivotally connected to the pivot component 24 and the spring tube 38 is pivotally connected to the upwardly extending component 30. The pull on the pivot component 24 thus creates a torque that is constantly trying to open the shell 12. The compression spring 36 may be adjusted to permit a non-linear force to be applied to the pivot component 24 so that the maximum assist is given to the user when the shell 12 is closed and tapers as the shell 12 is opened.

The enclosure 10 may also include a locking mechanism for securing the shell 12 in the closed position to protect the vehicle inside. Preferably, the locking mechanism is located at the end of the shell 12 opposite the cross rod component 18 and permits the shell 12 to be secured to the upwardly extending component 30, but in practice may be located anywhere on the device. It is understood that any suitable locking mechanism can be used on the enclosure 10 so long as it secures the shell 12 to the base. The lockable latching mechanism shown in FIG. 14 may also be used wherein the latch assembly 42 is attached to the shell 12 or skirt frame 20 and the catch 44 is attached to the upwardly extending component 30. The mechanism includes a metal latch plate 46 that is preferably attached to the skirt frame 20 to further ensure the security of the enclosure 10 and vehicle inside.

Figure 35:
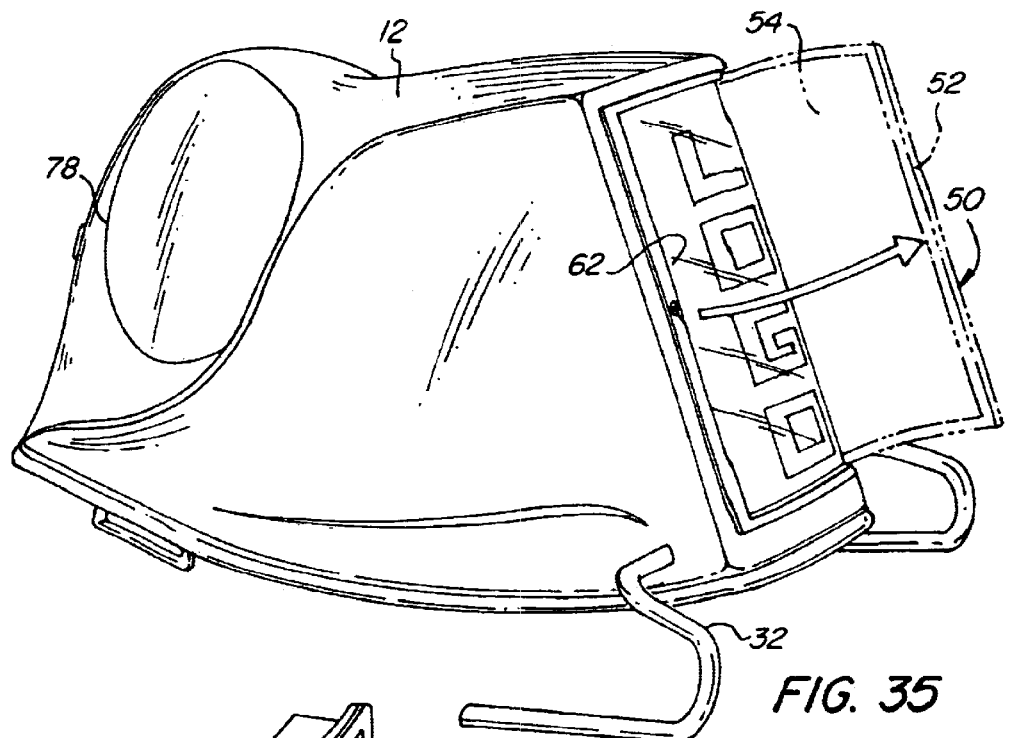
FIG. 35 is an isometric view of the enclosure of FIG. 1 including a box and designated area for displaying advertisements in accordance with the invention.
Figure 36:
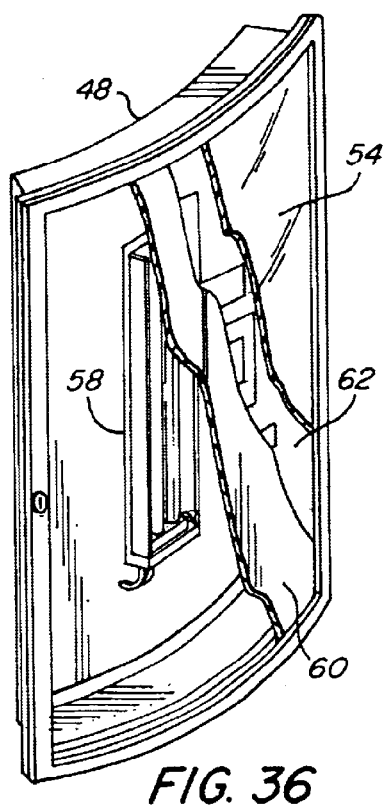
FIGS. 36 and 37 are cut-away views of the box of FIG. 35 in closed and open positions, respectively, and including an illumination means.
Figure 37:
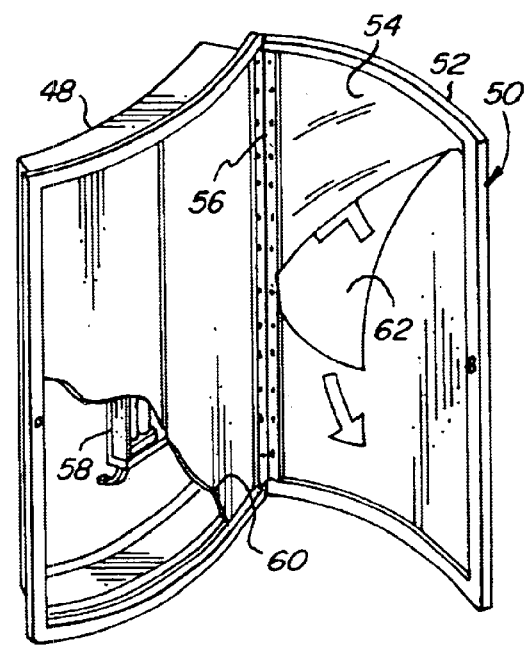

There are several means for displaying advertisements on the enclosure 10. FIGS. 35–37 depict an illuminated light box 48 for displaying advertisements. A door 50, including a frame 52 and window 54, is connected to the light box 48, preferably by at least one hinge 56. The window 54 is preferably a durable, clear plastic, such as Lexan®, but any transparent material may be used. The light box 48 contains a light source 58, preferably fluorescent tubes, and a diffuser panel 60 located between the light source 58 and the transparent window 54 for providing even light to an advertisement 62. The advertisement 62 may be attached to the diffuser panel, as shown in FIG. 35, or attached to the inner surface of the transparent window 54, as shown in FIG. 37. This can be achieved using any known method such as using mechanical means holding the edges of the advertisement 62 or using an adhesive. Preferably, the advertisement 62 is held in place by static adhesion between the window 54 and the advertisement 62. The use of static adhesion eases the installation and removal of the advertisement 62.

While the above description refers specifically to backlit advertisements, it is understood that the advertisement may be illuminated by any suitable means or, alternatively, not illuminated at all. Other illumination possibilities include, without limitation, utilizing a fiber-optic fabric to provide backlight, providing light to the advertisement by illuminating the edges of the diffuser panel or window depending on the location of the advertisement, or illuminating the advertisement using an external light source.

Figure 38:
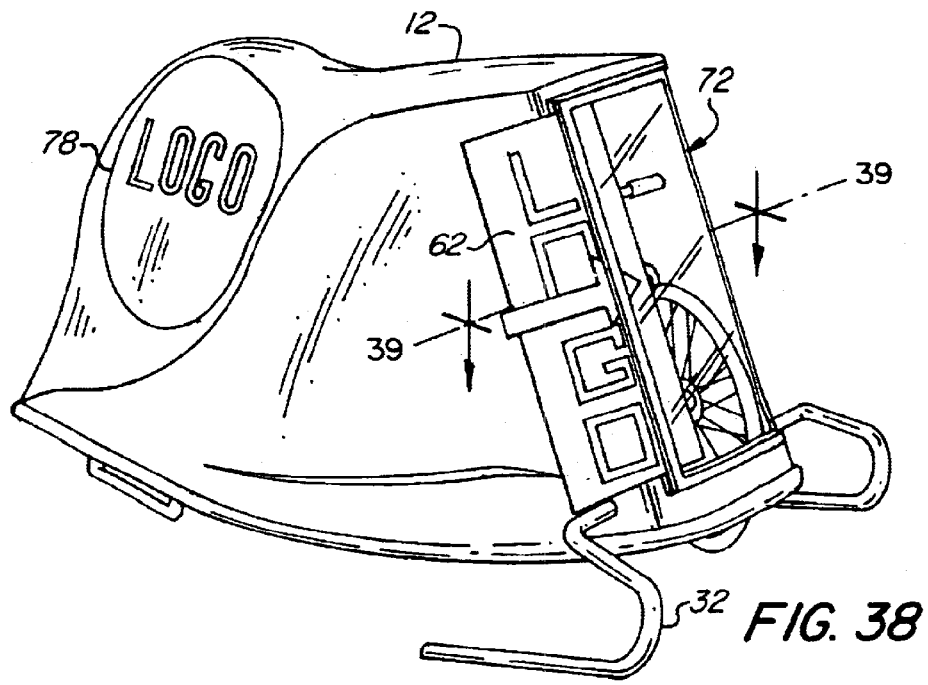
FIG. 38 is an isometric view of the enclosure of FIG. 1 including a display window for advertisements in accordance with the invention.
Figure 39:
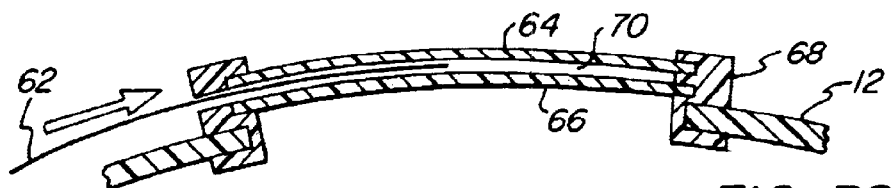
FIG. 39 is a cross-sectional view of the display window of FIG. 38 along the axis of A—A.
Figure 42:
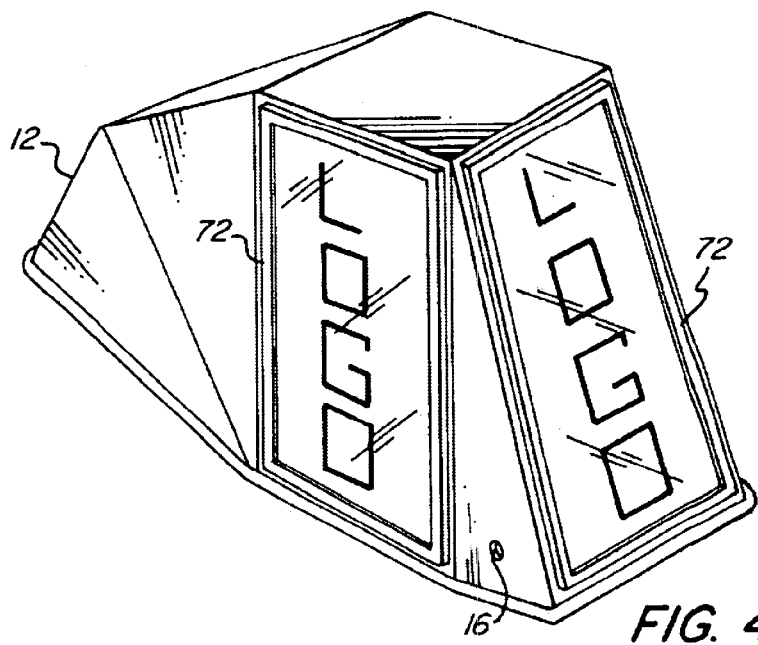
FIG. 42 is an isometric view of the enclosure of FIG. 1 including a plurality of display windows for advertisements in accordance with the invention.

Another means for displaying advertisements is shown in FIGS. 38 and 39 which depict a display window 72 on the enclosure 10. The display window 72 is located in an opening in the shell 12 and includes a front pane 64 and a back pane 66 displaced from one another by a spacer device 68 to create a space 70 therebetween for receiving an advertisement 62. Only the front pane 64 need be transparent for displaying the advertisement 62. Preferably, both front pane 64 and back pane 66 are transparent to create a window for viewing the contents of the enclosure 10 when advertisements 62 are not in place or do not utilize the full display window. The window would have the beneficial effect of deterring illicit activities form occurring in the enclosure 10. Additionally, the window would permit viewing of the contents without allowing rain or moisture to enter the enclosure 10 while viewing the contents, which is not possible using standard viewing holes. Multiple display windows may be included on the shell 12 as shown in FIG. 42.

Figure 40:
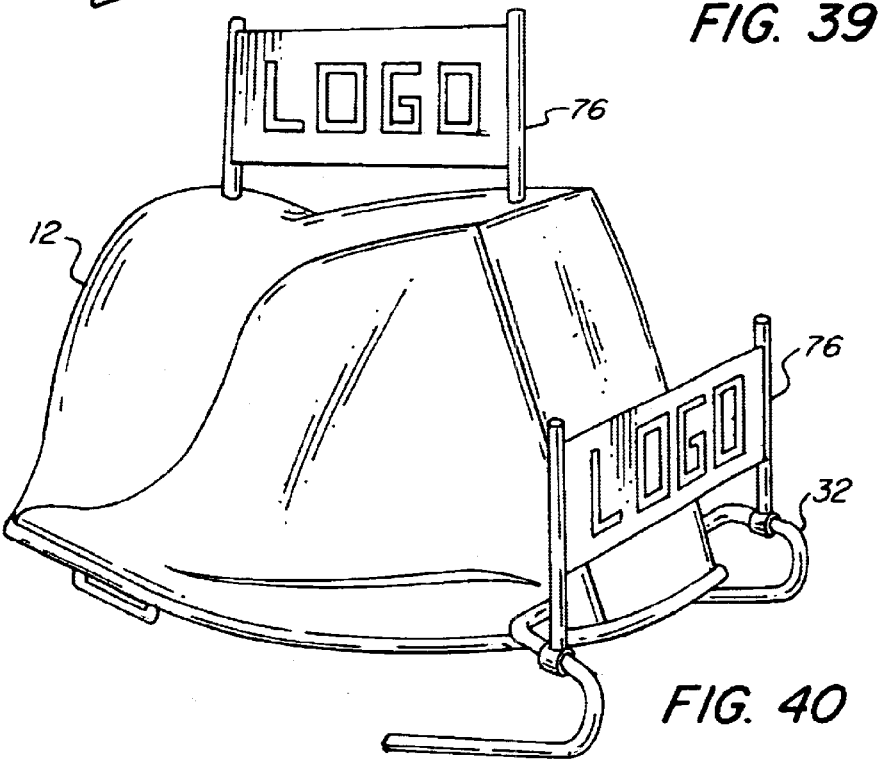
FIG. 40 is an isometric view of the enclosure of FIG. 1 including rigid display banners in accordance with the invention.
Figure 41:
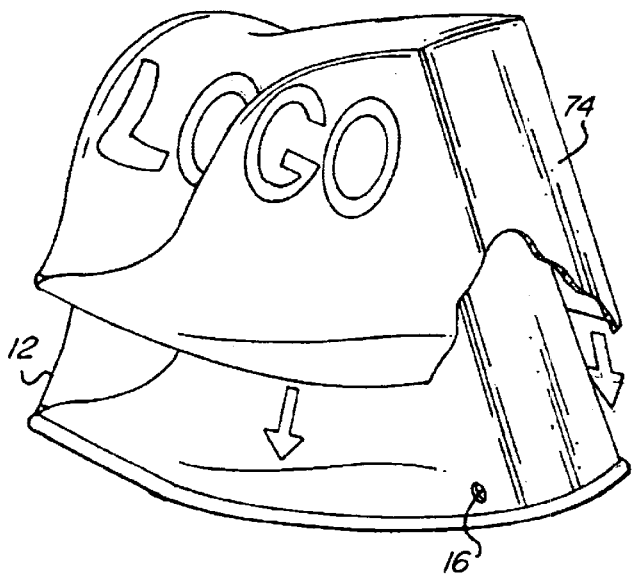
FIG. 41 is an isometric view of a pressure-sensitive vinyl coating advertisement for the enclosure of FIG. 1 in accordance with the invention.
Figure 43:
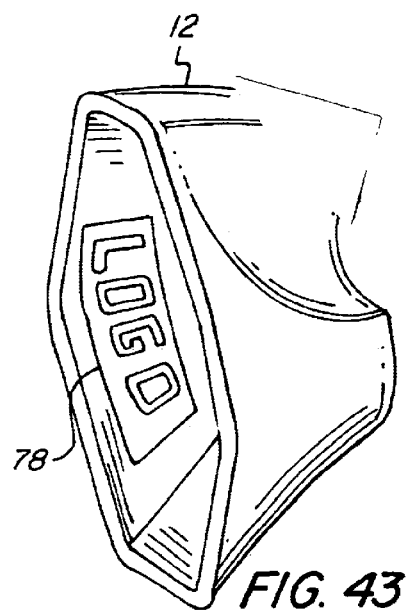
FIG. 43 is an isometric view of the enclosure of FIG. 1 including advertisements on the interior of the enclosure in accordance with the invention.

FIG. 41 depicts another means for displaying advertisements on the enclosure 10. As is shown, a pressure-sensitive vinyl film 74 may be applied to the entire shell 12 for displaying advertisements thereon. Such films 74 provide greater flexibility on the size and content of the message to be displayed. Another display means is shown in FIG. 40, which shows a rigid banner or sign 76 containing the advertisement is attached to either the shell 12 or base. The banner or sign 76 could also be placed upon a kiosk in conjunction with or near the enclosures 10. FIG. 38 depicts another means wherein the shell 12 includes a designated surface 78 for receiving adhesive advertisements. The surface is also indicated in FIGS. 1 and 35. The dedicated area 78 may be a raised area for properly positioning and aligning advertisements or may be a flat, polished area to ensure smooth, even placement of the advertisement. The area could also include small registration bumps for properly locating and aligning the advertisement on the shell 12. As shown in FIG. 14, such advertisements can also be placed on the inside of the shell 12.

Several other means for advertising may be used to convey advertisements with the enclosure. The enclosure may contain a switched speaker system that would convey an audible message or advertisement when the enclosure was opened. The enclosure could also contain a digital display screen for displaying static or animated advertisements. Such a system would permit the display of several different advertisements by changing the display after a set period of time. For example, the screen could display a continuous series of twenty different advertisements, each advertisement being displayed for fifteen minutes at a time. Additionally, the enclosure could also contain a telecommunications link so that the electronic advertisements could be changed from a remote location negating the need for service at the location.

Any combination of the above means for displaying and conveying advertisements can be used to maximize the available advertising space on the enclosures 10.

Figure 44:
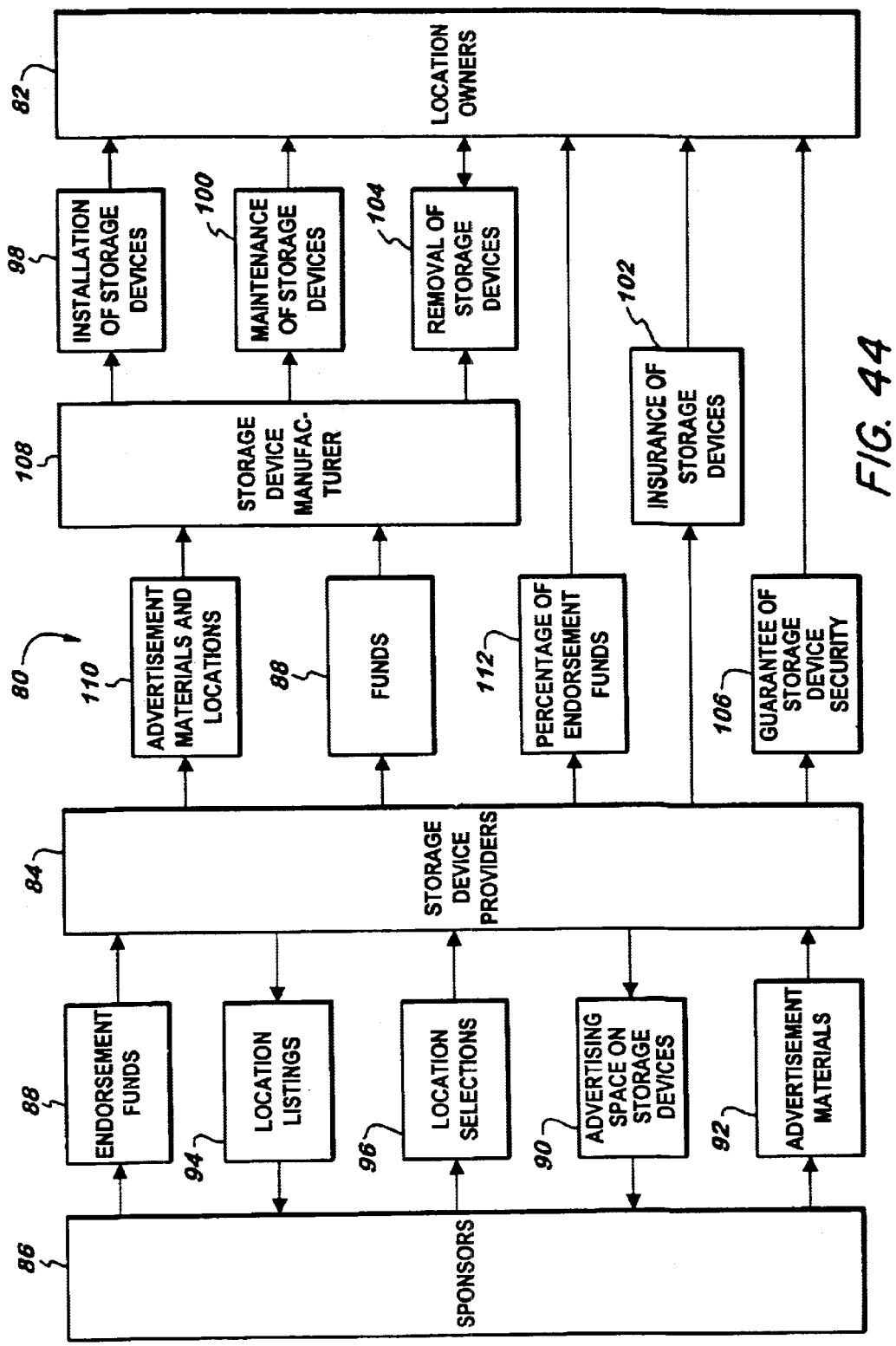
FIG. 44 is a schematic of a method for provision of the small vehicle storage devices of FIG. 1 to site owners at no cost in accordance with the invention.

The invention further pertains to business method 80 for providing such small vehicle enclosures 10 to site owners 82 at no cost to the site owner 82, as shown in FIG. 44. The method starts by a storage device provider 84 soliciting companies, organizations, or other entities seeking high-profile advertising and the chance associate themselves with environmentally-friendly concepts and products. The companies are offered the opportunity to become sponsors 86 of the program 80 by providing endorsement funds 88 in exchange for advertising space in conjunction with the storage devices or to become site owners 82 by providing locations for placement of the devices. The solicited companies and organizations will recognize the benefits of being associated with the inexpensive, bicycle-parking program, namely an increased positive public perception by being affiliated with an environmentally-conscience program that encourages pollution-free transportation and the use of recycled materials.

As indicated above, the solicitation process consists of procuring sponsors 86 and site owners 82. Preferably, locations are previously secured from site owners, so that sponsors may be presented with a listing of available locations 94 for which to provide the devices and advertising. Upon selection by the sponsor 86 of a desired location, the device provider 84 may provide the sponsor 86 with the available advertising options 90 associated with the location. These options 90 may vary depending on the specific situations surrounding the desired location. Generally, the advertising options 90 will include any of the advertising means described above for use in conjunction with the devices. However, depending on local laws and regulations and/or site owner preferences, the available advertising options 90 may be limited. The available advertising space need not be in the direct proximity of the devices, either. The sponsor 86 could be offered advertising space at an advertising kiosk at a remote location or a billboard or banner location in or on a facility. For example, a sponsor 86 may wish to provide devices to a college in exchange for advertising space in the college's sports facilities or a mall may not wish to have advertising on the devices but is willing to provide advertising space within the mall.

It is understood that the procurement of sponsors 86 and site owners 82 can occur simultaneously or contemporaneously. As such, a sponsor 86 could request a specific advertising option and the device provider 84 could provide a list of available locations permitting or requesting the specific advertising option. It is also understood that the sponsor 86 and site owner 82 need not be separate entities. For example, a company may wish to have the storage devices installed at one of its own locations and have its own advertising associated with the devices. Additionally, the solicitation process can include bringing the sponsors 86 and available site owners 82 together to mutually decide on locations for the devices and the advertising options to further facilitate the solicitation process. This would be especially useful for a sponsor 86 who wished specifically target and customize its advertising for a specific location.

Upon selection 96 of the desired location and/or advertising options, sponsors 86 pay endorsement funds 88 and provide advertising materials 92 compatible to the selected advertising options to the device provider 84. The storage device provider 84, using funds 88 received from the sponsors 86 for the advertising space, manufactures and installs 98 the devices at the chosen locations. The device provider 84 is then responsible for all the service requirements of the devices including maintenance 100, cleaning, liability insurance 102, and removal 104, when necessary. These service requirements are paid for using the funds 88 received from the sponsors 86. Therefore, the site owner 82 need not incur any costs in acquiring and maintaining the small vehicle storage devices for their customers, employees, etc. The storage device provider 84 may also offer guarantees 106 of the security, of vehicles stored in the storage devices. The provision of the services and the guarantees promote the program by both making it practically cost free for a site owner 82 to obtain the storage devices and building confidence in the users of the devices by guaranteeing their vehicles' safety. Additionally, the devices can be provided free of charge to users to further promote use. These aspects of the invention have the effect of increasing demand for the storage device and ultimately increasing the use of alternative modes of transportation.

In practice, the storage device provider 84 need not provide all of the services itself. The device provider 84 may solicit and obtain funds, advertising, locations, and device requests from the sponsors 86 and site owners 82, but then transfer the device request including selected advertisements and locations 110 to a manufacturer 108 or other third party for construction, installation, maintenance and removal of the devices and advertisements. The device provider 84 would compensate the manufacturer 108 or third party for their services using the funds 88 received from the sponsors 86. By contracting with third parties for certain services, the device provider 84 is able to reduce costs and more effectively promote the growth of the program.

Additionally, site owners 82 may be given the option of providing keyed or combination access to the storage devices so that the site owners 82 could collect fees for use of the device. All proceeds derived from the fees could be retained by the site owners 82 to provide them with an additional incentive to offer the storage devices at their location. The device provider 84 may further attract and entice site owners 82 by paying the site owners 82 a portion 112 of the funds received for the advertising on the devices installed at their locations in return for use of the locations. Under these schemes, the site owner is essentially paid to provide a location for the storage devices.

Although the invention has been described with reference to a particular arrangement of parts, features, steps and the like, these are not intended to exhaust all possible arrangements of features, and indeed many other modifications and variations will be ascertainable to those of skill in the art.

What is claimed is:

1. An enclosure for a vehicle comprising:
 a frame having a cross rod component terminating at first and second ends, and an upwardly extending rod component connected to said cross rod component, said upwardly extending rod component being shaped so as to flank a side of the vehicle for lateral support thereof;
 a rigid shell pivotally mounted to the cross rod component between said cross rod component's first and second ends to swing between an open position for insertion and removal of the vehicle, and a closed position wherein said shell is lowered to at least substantially enclose the vehicle to resist theft of the vehicle or components thereof; and,
 means, connected to said enclosure, for displaying advertisements.

2. The enclosure of claim 1 wherein said frame further comprises a skirt frame pivotally connected to said cross rod component and extending around an inner periphery of a bottom edge of said rigid shell.

3. The enclosure of claim 2 wherein said frame further comprises a shell support component connected to said skirt frame and extending upwardly into said rigid shell to provide support thereof and further protect the vehicle from theft.

4. The enclosure of claim 3 wherein at least a portion of said skirt frame extends below said bottom edge of said rigid shell for defining a gap between the said shell and base for permitting inspection of the contents of the enclosure to deter illicit activities.

5. The enclosure of claim 1 wherein said upwardly extending rod component comprises two opposing smooth radius curves and a first terminus and second terminus, said first terminus being connected to said cross rod component.

6. The enclosure of claim 5 further comprising an assist mechanism for raising said rigid shell to said open position.

7. The enclosure of claim 6 wherein said assist mechanism comprises a spring-loaded actuator arm extending between said second terminus of said upwardly extending rod component and a pivot component that pivotally connects said rigid shell to said cross rod component.

8. The enclosure of claim 1 further comprising a lockable latching mechanism for securing said rigid shell to said upwardly extending rod component.

9. The enclosure of claim 1 wherein said advertising means comprises a box for displaying advertisements.

10. The enclosure of claim 9 wherein said box is illuminated for displaying advertisements in dark conditions.

11. The enclosure of claim 10 wherein said box comprises a door including a frame and a window connected to said box by at least one hinge, a light source located within said box, and a diffuser panel located between said light source and said door wherein said advertisements are attached to an inner surface of said window.

12. The enclosure of claim 11 wherein said advertisements are attached by static adhesion to said window.

13. The enclosure of claim 1 wherein said advertising means comprises a display window including a front window and a back window, said front and back windows being displaced to create a space therebetween for receiving advertisements.

14. The enclosure of claim 1 wherein said advertising means comprises a rigid display banner attachable to said enclosure.

15. The enclosure of claim 1 wherein said advertising means comprises a pressure-sensitive vinyl coating covering said rigid shell for displaying advertisements.

16. The enclosure of claim 1 wherein said advertising means comprises a surface on said rigid shell for receiving and aligning advertisements.

17. An enclosure for a vehicle comprising:
 a base for supporting the vehicle;
 a shell pivotally mounted to said base and movable between an open position and a closed position, said shell having a peripheral edge;
 a skirt frame extending around said peripheral edge of said shell;
 at least one component of said skirt frame extending below said peripheral edge of said shell to support said shell at a position above said base to define a gap therebetween for permitting inspection of the contents of the enclosure to deter illicit; and
 a shell support component connected to said skirt frame and extending upwardly into said shell to provide support thereof and further protect the vehicle from theft.

18. An enclosure for a vehicle comprising:
 a base for supporting the vehicle;
 a shell pivotally mounted to said base and movable between an open position and a closed position, said shell having a peripheral edge at least a portion ofeb- ;normal which lies above said base creating a gap for inspection of the contents of the enclosure to deter illicit activities;

a shell support component connected to said shell and extending upwardly into said shell and spaced apart from said shell to provide support thereof and further protect the vehicle from theft; and means connected to said enclosure for displaying advertisements.

19. The enclosure of claim 18 wherein said advertising means comprises a box for displaying advertisements.

20. The enclosure of claim 19 wherein said box is illuminated to increase the visibility of advertisements.

21. The enclosure of claim 20 wherein said box comprises a door including a frame and a window connected to said box by at least one hinge, a light source located within said box, and a diffuser panel located between said light source and said door wherein said advertisements are attached to an inner surface of said window.

22. The enclosure of claim 21 wherein said advertisements are attached by static adhesion to said window.

23. The enclosure of claim 18 wherein said advertising means comprises a display window including a front pane and a back pane, said front and back panes being displaced to create a space therebetween for receiving advertising materials.

24. The enclosure of claim 18 wherein said advertising means comprises a rigid display banner attachable to said enclosure.

25. The enclosure of claim 18 wherein said advertising means comprises a pressure-sensitive vinyl coating covering said shell for displaying advertisements.

26. The enclosure of claim 18 wherein said advertising means comprises a surface on said shell for receiving and aligning adhesive advertisements.

* * * * *